US011601922B1

(12) United States Patent
Chu et al.

(10) Patent No.: US 11,601,922 B1
(45) Date of Patent: Mar. 7, 2023

(54) DETERMINING WHETHER A WIRELESS COMMUNICATION MEDIUM IS IDLE

(71) Applicant: NXP USA, Inc., Austin, TX (US)

(72) Inventors: Liwen Chu, San Ramon, CA (US);
Ken Kinwah Ho, San Jose, CA (US);
Lei Wang, San Diego, CA (US);
Jinjing Jiang, San Jose, CA (US);
Hongyuan Zhang, Fremont, CA (US);
Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 296 days.

(21) Appl. No.: 16/814,550

(22) Filed: Mar. 10, 2020

Related U.S. Application Data

(63) Continuation of application No. 15/706,534, filed on Sep. 15, 2017, now abandoned.
(Continued)

(51) Int. Cl.
*H04W 72/04* (2009.01)
*H04W 72/121* (2023.01)
(Continued)

(52) U.S. Cl.
CPC ....... *H04W 72/0413* (2013.01); *H04L 5/0037* (2013.01); *H04L 5/0055* (2013.01);
(Continued)

(58) Field of Classification Search
CPC ......... H04W 72/0413; H04W 72/0446; H04W 72/121; H04W 84/12; H04L 5/0037; H04L 5/0055; H04L 5/0094
See application file for complete search history.

(56) References Cited

U.S. PATENT DOCUMENTS

2012/0327870 A1* 12/2012 Grandhi ............ H04W 74/0816
370/329
2015/0146812 A1 5/2015 Chu et al.
(Continued)

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
(Continued)

*Primary Examiner* — Rina C Pancholi

(57) ABSTRACT

A first wireless communication device receives a packet from a second wireless communication device, the packet having information indicating that the second wireless communication device is relinquishing control of a wireless communication medium. The first wireless communication device determines whether the packet was transmitted in a wireless network to which the first wireless communication device belongs, and determines whether a network allocation vector (NAV) timer of the first wireless communication device was most recently set in connection with a transmission from the wireless network to which the first wireless communication device belongs. When i) the packet was transmitted in the wireless network to which the first wireless communication device belongs, and ii) the NAV timer was most recently set in connection with a transmission from another wireless network to which the first wireless communication device does not belong, the NAV timer is not reset.

16 Claims, 14 Drawing Sheets

Related U.S. Application Data

(60) Provisional application No. 62/394,866, filed on Sep. 15, 2016.

(51) Int. Cl.
    *H04L 5/00* (2006.01)
    *H04W 72/0446* (2023.01)
    *H04W 84/12* (2009.01)

(52) U.S. Cl.
    CPC ....... *H04L 5/0094* (2013.01); *H04W 72/0446* (2013.01); *H04W 72/121* (2013.01); *H04W 84/12* (2013.01)

(56) References Cited

U.S. PATENT DOCUMENTS

| | | | |
|---|---|---|---|
| 2016/0113034 A1 | 4/2016 | Seok | |
| 2017/0063509 A1 | 3/2017 | Kim et al. | |
| 2017/0064739 A1* | 3/2017 | Hedayat | H04L 5/0037 |
| 2018/0213558 A1* | 7/2018 | Kim | H04W 74/08 |

OTHER PUBLICATIONS

IEEE P802.11 ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11 ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Wang, "IEEE P802.11, Wireless LANs, Specification Framework for TGaz," Revision 1.1, *Institute of Electrical and Electronics Engineers*, doc. IEEE 802.11-17/0462r4, May 11, 2017, 15 pages.

Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).

\* cited by examiner

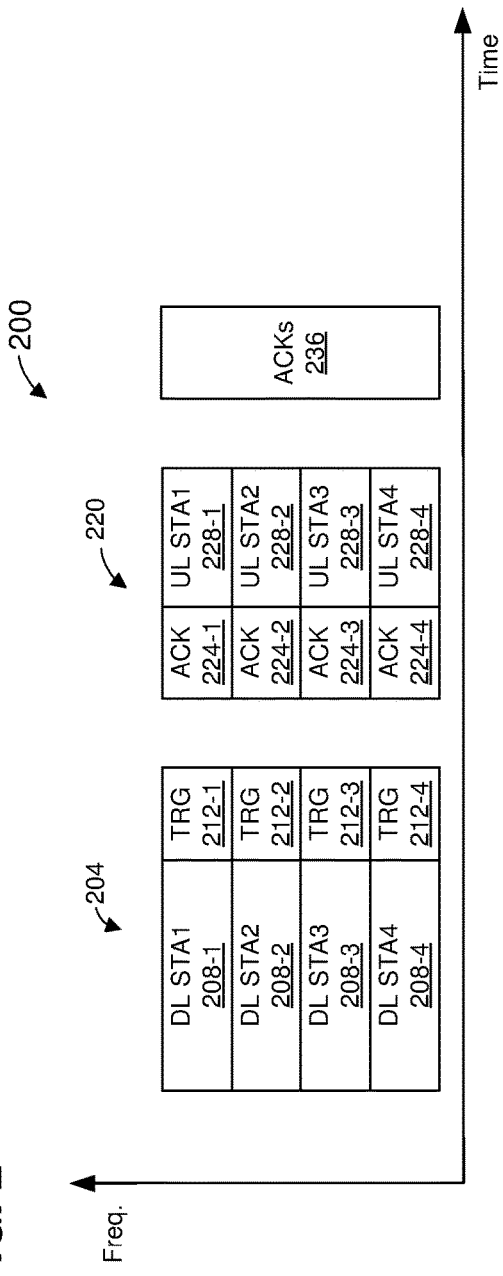
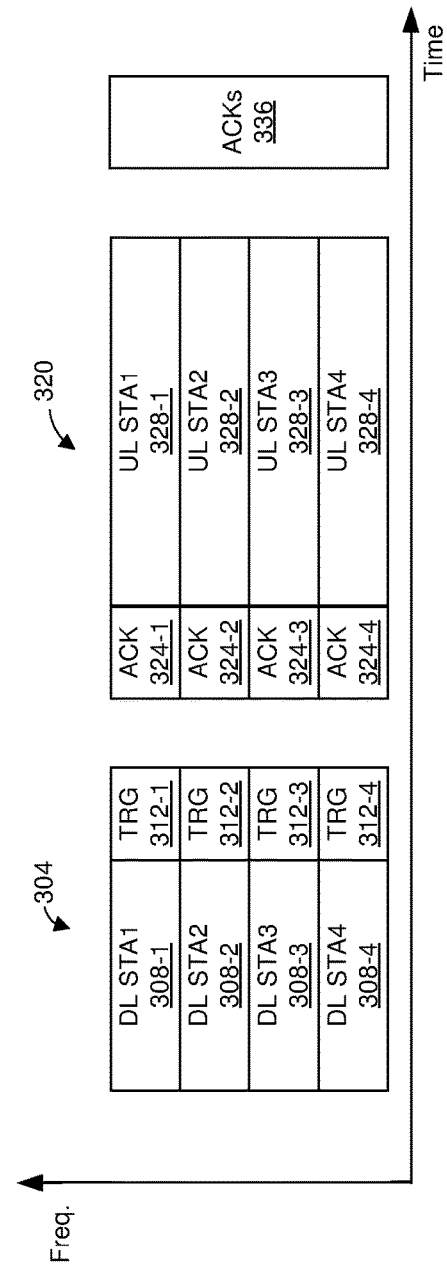
FIG. 2
FIG. 3

DETERMINING WHETHER A WIRELESS COMMUNICATION MEDIUM IS IDLE

CROSS REFERENCES TO RELATED APPLICATIONS

This application is a continuation of U.S. patent application Ser. No. 15/706,534, entitled "Multi-User Communications in WLAN," filed on Sep. 15, 2017, which claims the benefit of U.S. Provisional Patent Application No. 62/394,866, entitled "Solutions for Various MU Issues," filed on Sep. 15, 2016. Both of the applications referenced above are hereby expressly incorporated herein by reference in their entireties.

FIELD OF TECHNOLOGY

The present disclosure relates generally to wireless communication systems, and more particularly to determining whether a wireless communication medium is idle.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

A communication protocol defined by the IEEE 802.11ax Standard, now under development, will utilize multi-user (MU) communication techniques that involve simultaneous transmissions to or from multiple communication devices, such as MU multiple input, multiple output (MIMO) techniques and orthogonal frequency division multiple access (OFDMA) techniques.

SUMMARY

In an embodiment, a method for determining whether a wireless communication medium is idle includes: wirelessly receiving, at a first wireless communication device, a packet from a second wireless communication device, the packet including information indicating that the second wireless communication device is relinquishing control of the wireless communication medium; determining, at the first wireless communication device, whether the packet was transmitted in a wireless network to which the first wireless communication device belongs; determining, at the first wireless communication device, whether a network allocation vector (NAV) timer of the first wireless communication device was most recently set in connection with a transmission from the wireless network to which the first wireless communication device belongs, the NAV timer indicating whether the wireless communication medium is idle; in response to determining that i) the packet was transmitted in the wireless network to which the first wireless communication device belongs, and ii) the NAV timer was most recently set in connection with a transmission from another wireless network to which the first wireless communication device does not belong, determining, at the first wireless communication device, that the NAV timer will not be reset in response to receiving the packet; and in response to determining that i) the packet was not transmitted in the wireless network to which the first wireless communication device belongs, and ii) the NAV timer was most recently set in connection with the transmission from the wireless network to which the first wireless communication device belongs, determining, at the first wireless communication device, that the NAV timer will not be reset in response to receiving the packet.

In another embodiment, a first wireless communication device comprises: a wireless network interface device having: one or more integrated circuit (IC) devices, and a network allocation vector (NAV) timer implemented on the one or more IC devices. The NAV timer indicates whether a wireless communication medium is idle. The one or more IC devices are configured to: receive a packet that was wirelessly transmitted from a second wireless communication device, the packet including information indicating that the second wireless communication device is relinquishing control of the wireless communication medium; determine whether the packet was transmitted in a wireless network to which the first wireless communication device belongs; determine whether the NAV timer was most recently set in connection with a transmission from the wireless network to which the first wireless communication device belongs; in response to determining that i) the packet was transmitted in the wireless network to which the first wireless communication device belongs, and ii) the NAV timer was most recently set in connection with a transmission from another wireless network to which the first wireless communication device does not belong, determine that the NAV timer will not be reset in response to receiving the packet; and in response to determining that i) the packet was not transmitted in the wireless network to which the first wireless communication device belongs, and ii) the NAV timer was most recently set in connection with the transmission from the wireless network to which the first wireless communication device belongs, determine that the NAV timer will not be reset in response to receiving the packet.

BRIEF DESCRIPTION OF THE DRAWINGS

FIG. 2 is a timing diagram of an example non-cascading frame exchange, according to an embodiment.

FIG. 3 is a timing diagram of an example cascading frame exchange, according to an embodiment.

DETAILED DESCRIPTION

In some wireless communication networks, multi-user (MU) communication techniques that involve simultaneous transmissions to or from multiple communication devices are used to increase system throughput. Examples of MU communication techniques include MU multiple input, multiple output (MIMO) techniques and orthogonal frequency division multiple access (OFDMA) techniques.

In some wireless communication protocols, it is difficult for a communication device to determine whether the communication device is permitted to request an immediate acknowledgment of a data unit that the communication device transmitted as part of an MU communication. Embodiments of techniques described below permit a communication device to determine whether to request an immediate acknowledgment of a data unit that the communication device transmitted as part of an MU communication.

With densely deployed wireless communication networks, spatial reuse techniques permit proximate wireless communication networks to better share communication medium resources. Embodiments of techniques for improving the degree of spatial reuse amongst proximate wireless communication networks are described below.

Figure 1:
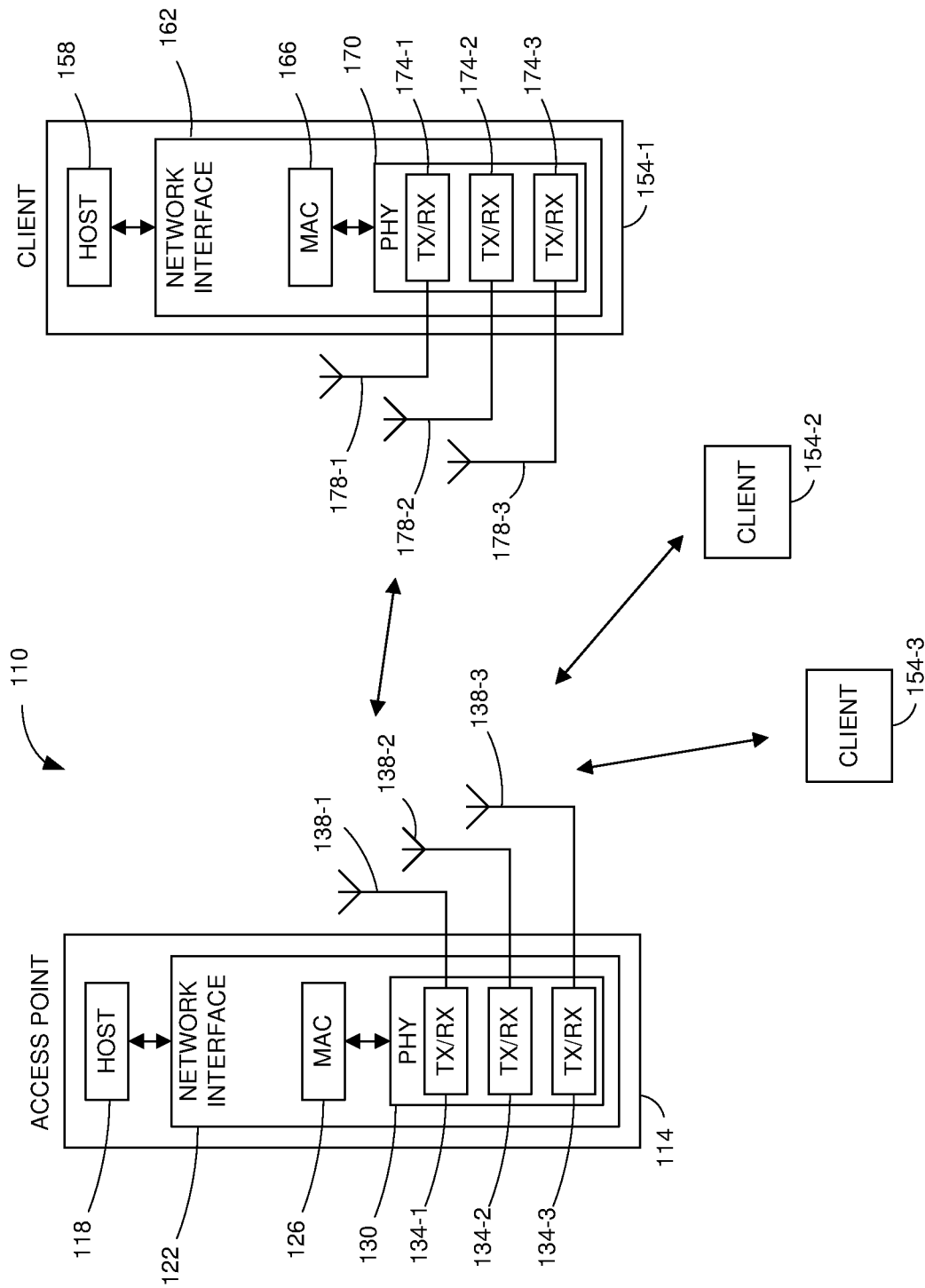
FIG. 1 is a block diagram of an example wireless local area network (WLAN) in which a multi-user (MU) data units are exchanged, according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

The AP 114 and the client stations 154 employ MU communication techniques that involve simultaneous transmissions to or from multiple communication devices are used to increase system throughput. For example, the AP 114 and the client stations 154 use MU MIMO techniques in which different data streams are simultaneously transmitted via different spatial streams, according to some embodiments. As another example, the AP 114 and the client stations 154 use OFDMA techniques in which different data streams are simultaneously transmitted via different frequency bands, according to some embodiments. In some embodiments, MU MIMO techniques and OFDMA techniques are used during the same MU transmission, e.g., to transmit some data streams via different frequency bands and to transmit some data streams via different spatial streams within a same frequency band. A downlink (DL) MU transmission refers to an MU transmission from the AP 114 to multiple client stations 154. An uplink (UL) MU transmission refers to an MU from multiple client stations 154 to the AP 114.

FIG. 2 is a diagram of an example communication exchange 200 between the AP 114 and a group of client stations 154, according to an embodiment. The communication exchange 200 is a type of exchange useful for when the AP 114 has DL data to transmit to multiple client stations 154 and the AP 114 is not concerned with providing opportunities for the client stations 154 to transmit UL data during the exchange 200.

The communication exchange 200 includes a DL MU PHY data unit 204 generated and transmitted by the AP 114. The DL OFDMA PHY data unit (e.g., a DL OFDMA PPDU) 204 includes a plurality of data frames 208 respectively included in different frequency bands, sometime referred to herein as frequency resource units (RUs). Each data frame 208 is intended for a different client station 154 and each data frame 208 includes different data. As used herein, the term "frame" refers to a MAC data unit, such as an MPDU, an MSDU, an aggregate MPDU (A-MPDU), etc.

The DL OFDMA PHY data unit 204 also includes a plurality of trigger frames 212 respectively included in different frequency RUs. In some embodiments, the trigger frames 212 are the same, whereas in other embodiments, at least one of the trigger frames 212 includes at least some data different than data in other trigger frames 212. The trigger frames 212 are configured to prompt a group of client stations 154 to transmit an UL OFDMA PHY data unit 220 (e.g., an UL OFDMA PPDU) a suitable time period after an end of the DL OFDMA PHY data unit 204. More specifically, in the example communication exchange 200, the trigger frames 212 are configured to prompt the group of client stations 154 to transmit, within the UL OFDMA PHY data unit 220, acknowledgements of the data frames 208.

As will be described below, each trigger frame 212 includes a field (e.g., a length field) that indicates a time duration of the UL OFDMA PHY data unit 220 that is to be transmitted in response to the trigger frames 212. In some embodiments, if a client station 154 has data to transmit to the AP 114 (UL data) and if the time duration of the UL OFDMA PHY data unit 220 is sufficient to include data in addition to an acknowledgment frame (e.g., to acknowledge the corresponding data frame 208 in the DL OFDMA PHY data unit 204), the client station 154 optionally can include a data frame in the UL OFDMA PHY data unit 220.

In the example communication exchange 200, each client station 154 in the group has opted to include UL data in the UL OFDMA PHY data unit 220. Thus, the UL OFDMA PHY data unit 220 includes a respective acknowledgment (ACK) frame 224 (or a block ACK frame) and a respective UL data frame 228. In an embodiment, the ACK frames 224 and the UL data frames 228 are respectively included in different frequency RUs.

In the example communication exchange 200, the AP 114 has opted to transmit acknowledgments 236 to the group of client stations 154 in response to the UL OFDMA PHY data unit 220. However, if the AP 114 had more DL data to transmit to the group of client stations 154, the AP 114 instead could have deferred acknowledging the UL data frames 228 and instead transmitted another DL MU PHY data unit similar to the DL OFDMA PHY data unit 204.

In some embodiments, if a first communication device requires that a second communication device immediately send an acknowledgment of a frame, rather than sending a block acknowledgment after receiving multiple frames for example, the first communication device may set a field in a MAC header of the frame to a value indicating a request for an immediate acknowledgment.

However, as discussed above, the communication exchange 200 designed for when the AP 114 has DL data to transmit to multiple client stations 154 and the AP 114 is not concerned with providing opportunities for the client stations 154 to transmit UL data. Thus, to ensure that the AP 114 maintains control of the communication medium, a communication protocol, according to which the network 110 operates, prohibits client stations 154 from requesting an immediate acknowledgment in a communication exchange such as the communication exchange 200, according to an embodiment. In other words, in the communication exchange 200, the client stations 154 are prohibited from requesting immediate acknowledgments for the UL data frames 228, in an embodiment.

FIG. 3 is a diagram of another example communication exchange 300 between the AP 114 and a group of client stations 154, according to an embodiment. Unlike the communication exchange 200, the communication exchange 300 is a type of exchange useful for when the AP 114 has DL data to transmit to multiple client stations 154 but also the AP 114 will provide opportunities for the client stations 154 to transmit UL data during the exchange 300. Generally, in communication exchanges such as the communication exchange 300, transmission in the communication medium alternates between the AP 114 and multiple client stations 154, and the time of transmission of the AP 114 versus client stations 154 is more equal as compared to the communication exchange 200 of FIG. 2. Communication exchanges such as the communication exchange 300 are sometimes referred to as "cascading MU communication exchanges" or "cascading MU frame exchanges". On the other hand, communication exchanges such as the communication exchange 200 are sometimes referred to as "non-cascading MU communication exchanges" or "non-cascading MU frame exchanges".

The cascading MU communication exchange 300 includes a DL MU PHY data unit 304 generated and transmitted by the AP 114. The DL OFDMA PHY data unit (e.g., a DL OFDMA PPDU) 304 includes a plurality of data frames 308 respectively included in different frequency RUs. Each data frame 308 is intended for a different client station 154 and each data frame 308 includes different data.

The DL OFDMA PHY data unit 304 also includes a plurality of trigger frames 312 respectively included in different frequency RUs. In some embodiments, the trigger frames 312 are the same, whereas in other embodiments, at least one of the trigger frames 312 includes at least some data different than data in other trigger frames 312. The trigger frames 312 are configured to prompt a group of client stations 154 to transmit an UL OFDMA PHY data unit 320 (e.g., an UL OFDMA PPDU) a suitable time period after an end of the DL OFDMA PHY data unit 304. More specifically, in the example cascading MU communication exchange 300, the trigger frames 312 are configured to prompt the group of client stations 154 to transmit, within the UL OFDMA PHY data unit 320, UL data.

Each trigger frame 312 includes a field (e.g., a length field) that indicates a time duration of the UL OFDMA PHY data unit 320 that is to be transmitted in response to the trigger frames 312. Generally, as compared to the communication exchange 200 of FIG. 2, the AP 114 permits longer durations of UL OFDMA PHY data unit 320 in communication exchanges. In other words, the value of the length field in the trigger frame 312 tends to indicate longer durations as compared to the length field in the trigger frame 212 of FIG. 2.

In the example cascading MU communication exchange 300, the UL OFDMA PHY data unit 320 includes a respective ACK frame 324 (or a block ACK frame) and a respective UL data frame 328 in respective frequency RUs. In an embodiment, the ACK frames 324 and the UL data frames 328 are respectively included in different frequency RUs.

In the example communication exchange 300, the AP 114 has opted to transmit acknowledgments 336 to the group of client stations 154 in response to the UL OFDMA PHY data unit 320. However, if the AP 114 had more DL data to transmit to the group of client stations 154, the AP 114 instead could have transmitted another DL MU PHY data unit similar to the DL OFDMA PHY data unit 304, where the other DL MU PHY data unit would include acknowledgments of the UL data frames 328 in the UL OFDMA PHY data unit 320.

In an embodiment, the communication protocol according to which the network 110 operates requires that client stations 154 request an immediate acknowledgment in a cascading MU communication exchange such as the cascading MU communication exchange 300, according to an embodiment. In other words, in the cascading MU communication exchange 300, the client stations 154 are required to request immediate acknowledgments for the UL data frames 328.

Thus, referring now to FIGS. 2 and 3, the communication protocol prohibits the client stations 154 from requesting immediate acknowledgments for the UL data frames 228 in the non-cascading MU communication exchange 200, whereas the communication protocol requires the client stations 154 to request immediate acknowledgments for the UL data frames 328 in the cascading MU communication exchange 300, according to an embodiment. However, it is difficult for the client stations 154 to distinguish whether a DL MU PPDU is part of a cascading MU communication exchange or a non-cascading MU frame exchanges, and thus it is difficult for the client stations 154 to determine whether the client stations 154 should request immediate acknowledgments for UL data frames that they will transmit responsive to trigger frames in the DL MU PPDU.

Although FIGS. 2 and 3 were described in the context of MU PHY data units that utilize OFDMA, similar frame exchanges may utilize other MU techniques such as MU MIMO. Thus, in some embodiments, MU PHY data units such as described in connection with FIGS. 2 and 3 utilize MU MIMO or combination of OFDMA and MU MIMO.

According to an embodiment, to help client stations 154 distinguish between DL MU PPDUs in cascading MU communication exchanges and DL MU PPDUs in non-cascading MU frame exchanges, the AP 114 utilizes a first type of trigger frame in DL MU PPDUs in cascading MU communication exchanges, and uses a second type of trigger frame in DL MU PPDUs in non-cascading MU communication exchanges. Depending on the type of trigger frame in a DL MU PPDU, the client station 154 determines whether to request immediate acknowledgments for UL data frames that the client station 154 will transmit in response to the trigger frame.

Figure 4A:
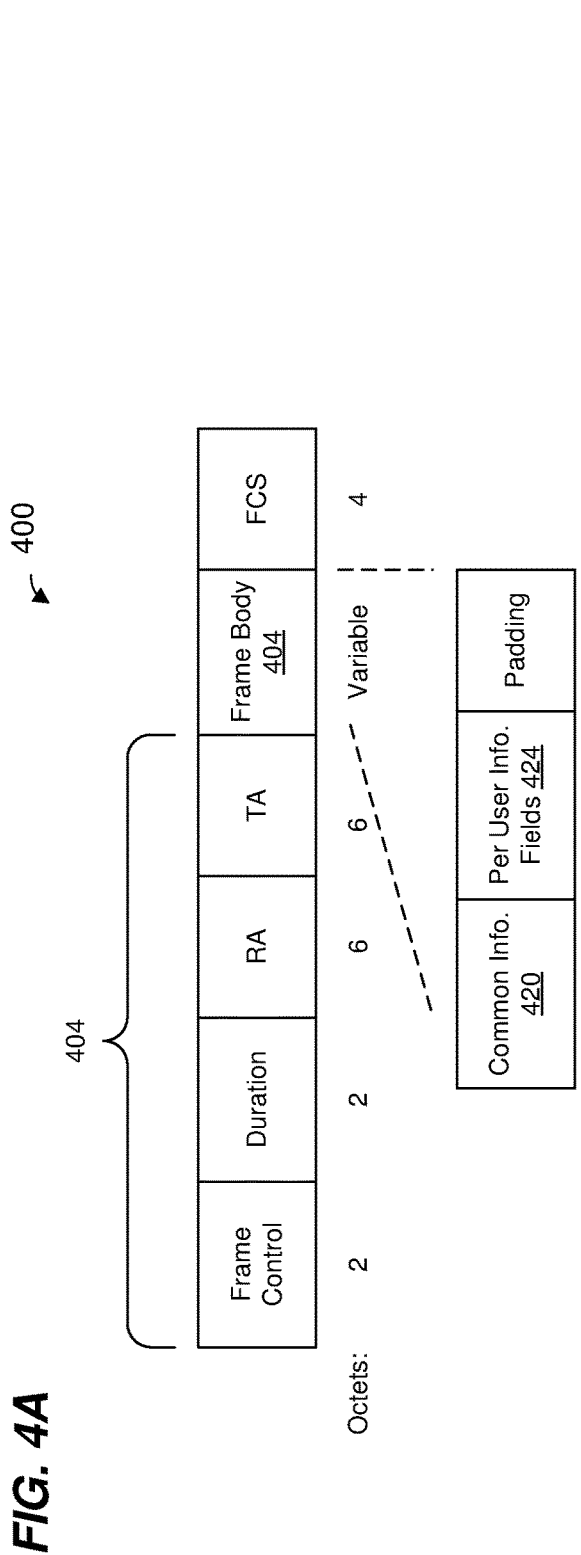
FIG. 4A is a block diagram of an example trigger frame that is used by an access point to prompt a plurality of client stations to simultaneously transmit as part of an uplink (UL) multiuser (MU) transmission, according to an embodiment.

FIG. 4A is a diagram of an example trigger frame 400 according to an embodiment. In an embodiment, the MAC processor 126 (FIG. 1) generates the trigger frame 400 and provides the trigger frame 400 to the PHY processor 130, which then generates a DL MU PHY data unit for transmission to a group of client stations 154. In other embodiments, another suitable communication device generates the trigger frame 400.

FIG. 4A includes example numbers of octets of various fields of the trigger frame 400. In other embodiments, different suitable numbers of octets and bits are utilized. In other embodiments, one or more of the fields illustrated in FIG. 4A are omitted, and/or one or more additional fields are included.

The trigger frame 400 includes a MAC header 404 and a frame body 404. The frame body 404 includes a common information field 420 and a plurality of per user information fields 424. The common information field 420 includes information that is intended for of the client stations 154 that are intended recipients of the trigger frame 400. On the other hand, respective per user information fields 424 correspond to respective intended recipients of the trigger frame 400 and include respective information specific to, and intended for, the respective intended recipients.

Figure 4B:
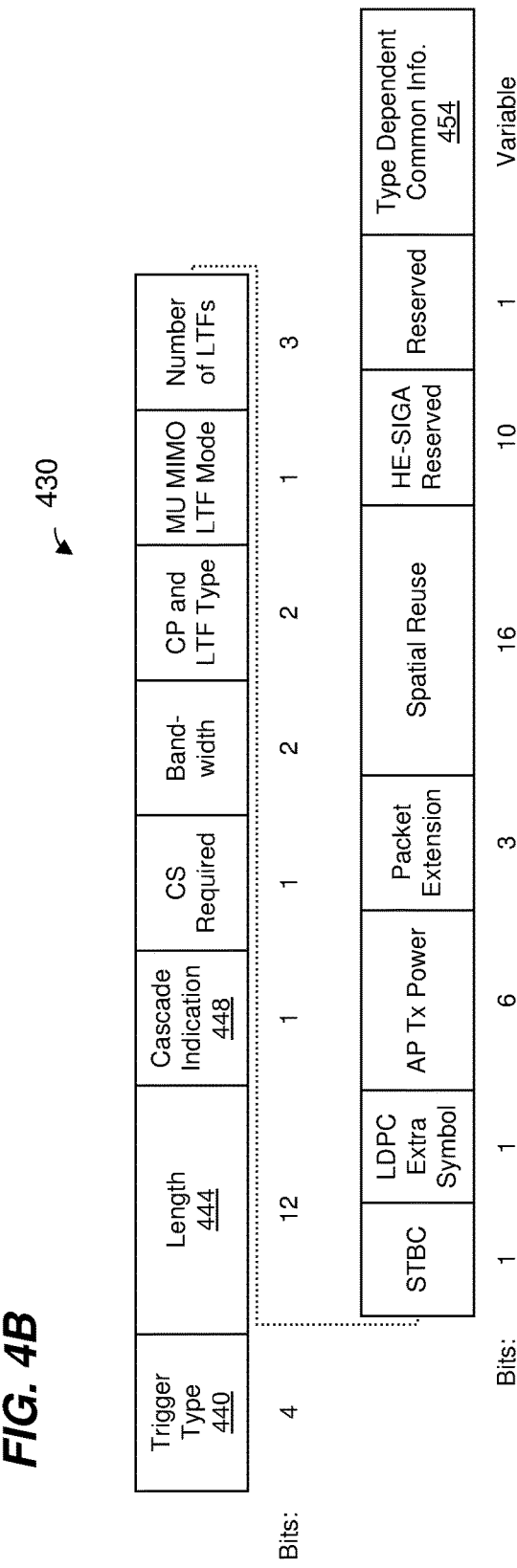
FIG. 4B is a block diagram of an example common information field that is included in a first type of trigger frame, according to an embodiment.

In an embodiment, the format of the common information field 420 and/or the format of the per user information fields 424 of FIG. 4B is different for at least some of the types of triggers. In an embodiment, the format of the common information field 420 is consistent with the basic trigger type.

FIG. 4B is a diagram of an example of the common information field 430 that is used in at least basic trigger frames, e.g., as the common user information field 420, according to an embodiment. FIG. 4B includes example numbers of bits of various fields of the common information field 430. In other embodiments, different suitable numbers of bits are utilized. In other embodiments, one or more of the fields illustrated in FIG. 4B are omitted, and/or one or more additional fields are included.

The common information field 430 includes a trigger type field 440. In an embodiment, the communication protocol defines a plurality of types of trigger frames, and the AP 114 (e.g., the MAC processor 126) populates the trigger type field 440 with a value that specifies the particular type of each trigger frame. In an embodiment, the plurality of types of trigger frames includes a first type utilized in cascading MU frame exchanges, and a second type utilized in non-cascading MU frame exchanges. In an embodiment, the first type of trigger frame is referred to as a "basic trigger", and the second type of trigger frame is referred to as a "UL acknowledgment variant trigger". In some embodiments, the plurality of types of trigger frames also includes one of, or any suitable combination of two or more of, a trigger for polling client stations 154 for beamforming training feedback, a trigger for requesting an MU block acknowledgment (an MU block acknowledgment request (MU-BAR) trigger), a trigger corresponding to an MU request-to-send (an MU-RTS trigger), and a trigger for polling client stations 154 for buffer status (a buffer status report poll (BSRP) trigger)), etc.

The common information field 430 includes a length field 444. The AP 114 (e.g., the MAC processor 126) populates the length field 444 with a value that indicates a maximum duration of the UL MU PPDU that is to be transmitted in response to the trigger frame.

The common information field 430 also includes a cascade indication field 448. The AP 114 (e.g., the MAC processor 126) populates the cascade indication field 448 with a value that indicates whether the AP 114 will be transmitting another trigger frame subsequent to the current trigger frame.

For at least one type of trigger frame (e.g., at least the basic trigger type) the common information field 430 includes a type dependent common information field 454. The type dependent common information field 454 includes different types of information for different trigger types, in an embodiment.

Figure 4C:
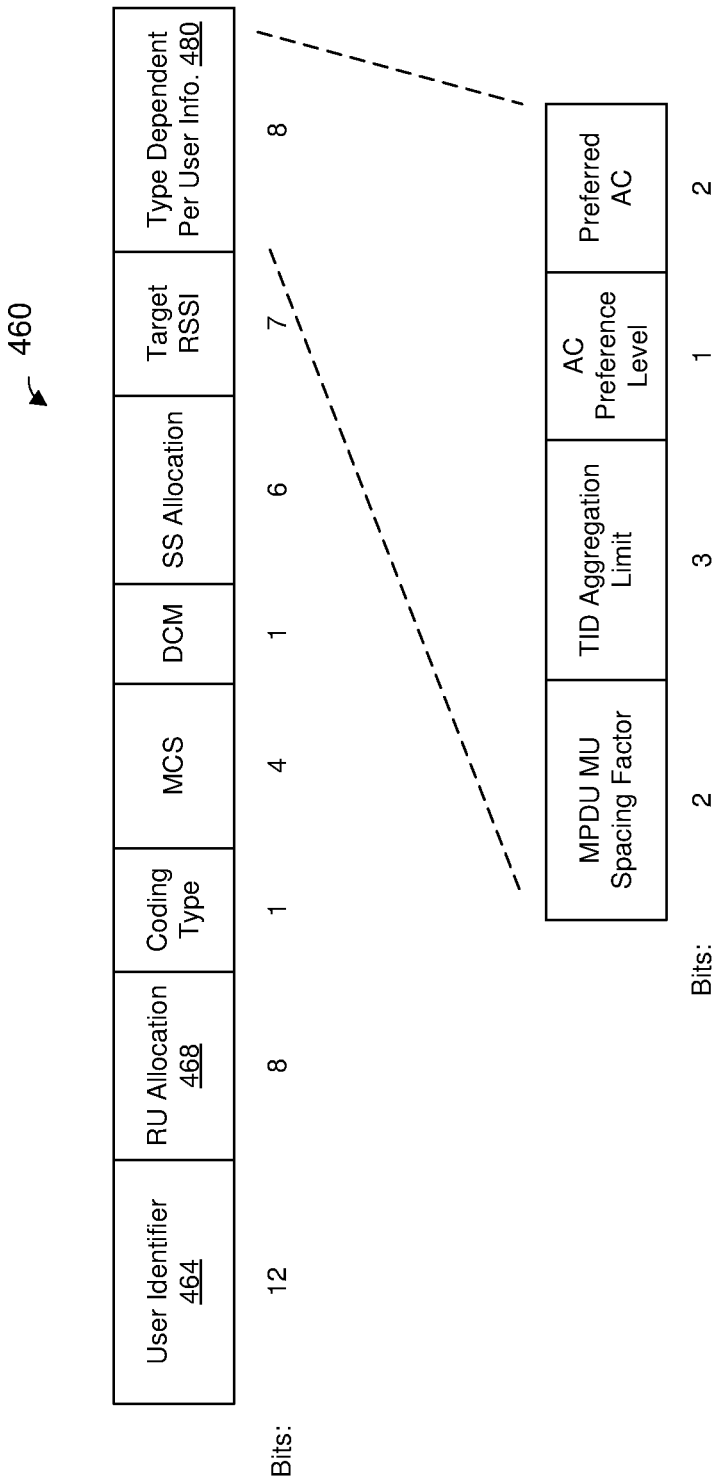
FIG. 4C is a block diagram of an example per user information field that is included in the first type of trigger frame, according to an embodiment.

FIG. 4C is a diagram of an example of the per user information field 460 that is used in at least basic trigger frames, e.g., as a per user information field 424, according to an embodiment. FIG. 4C includes example numbers of bits of various fields of the per user information field 460. In other embodiments, different suitable numbers of bits are utilized. In other embodiments, one or more of the fields illustrated in FIG. 4C are omitted, and/or one or more additional fields are included.

In an embodiment, the basic trigger includes a respective per user information field 460 for each client station 154 that is an intended recipient of the trigger frame. The per user information field 460 includes a user identifier field 464 to indicate that the per user information field 460 corresponds to a particular client station 154. In an embodiment, the user identifier field 464 includes an association identifier (AID) of a client station 154. In another embodiment, the user identifier field 464 includes only a portion of an AID of a client station 154, e.g., a partial AID or PAID.

The per user information field 460 includes an RU allocation field 468 that indicates an RU allocation for the client station 154 (identified in the field 464) for the subsequent UL MU transmission being prompted by the trigger frame 400.

The per user information field 460 also includes a type dependent per user information field 480. The type dependent per user information field 480 includes different types of information for different trigger types, in an embodiment.

Figure 5A:
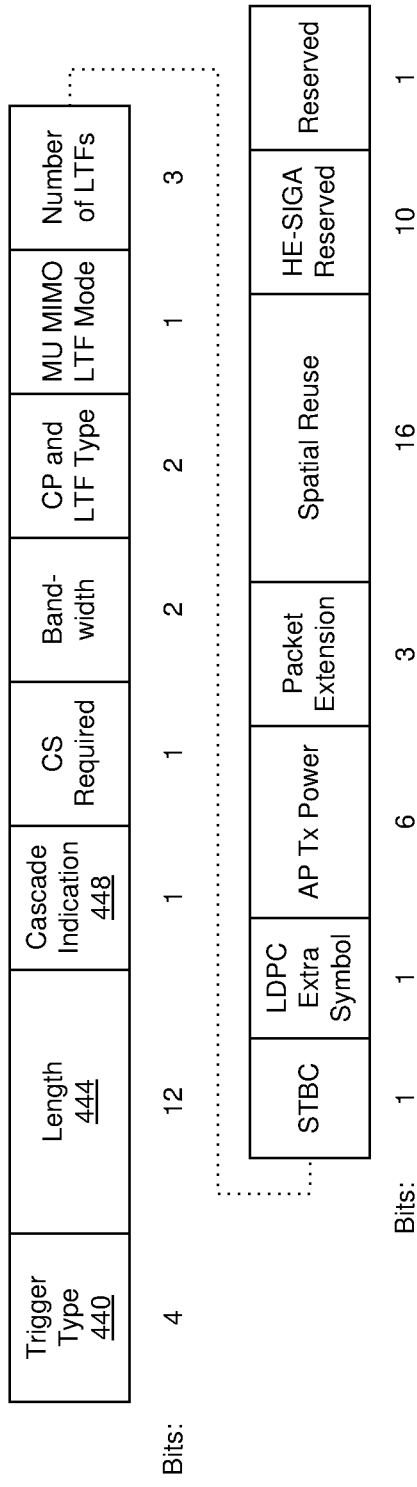
FIG. 5A is a block diagram of an example common information field that is included in a second type of trigger frame, according to an embodiment.

FIG. 5A is a diagram of an example common information field 500 that is used in at least UL acknowledgment variant trigger frames, e.g., as the common user information field 420, according to an embodiment. FIG. 5A includes example numbers of bits of various fields of the common information field 500. In other embodiments, different suitable numbers of bits are utilized. In other embodiments, one or more of the fields illustrated in FIG. 5A are omitted, and/or one or more additional fields are included.

The common information field 500 is the same as the common information field 430, except that the common information field 500 omits the type dependent common information field 454, according to an embodiment. In an embodiment, the common information field 500 is shorter than the common information field 430 due to the omission of the type dependent common information field 454, for example.

Figure 5B:
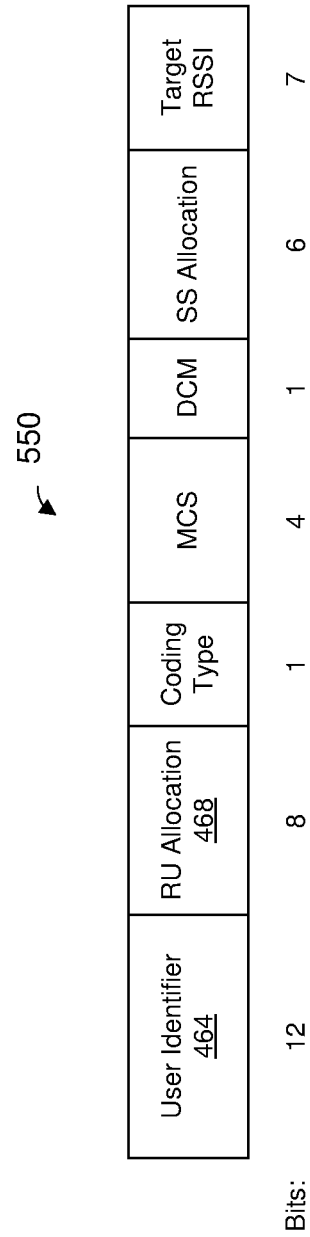
FIG. 5B is a block diagram of an example per user information field that is included in the second type of trigger frame, according to an embodiment.

FIG. 5B is a diagram of an example per user information field 550 that is used in at least UL acknowledgment variant trigger frames, e.g., as the per user information field 424, according to an embodiment. FIG. 5B includes example numbers of bits of various fields of the per user information field 550. In other embodiments, different suitable numbers of bits are utilized. In other embodiments, one or more of the fields illustrated in FIG. 5B are omitted, and/or one or more additional fields are included.

The per user information field 550 is the same as the per user information field 460, except that the per user information field 550 omits the type dependent per user information field 480, according to an embodiment. In an embodiment, the per user information field 550 is shorter than the per user information field 460 due to the omission of the type dependent per user information field 480, for example.

Figure 6:
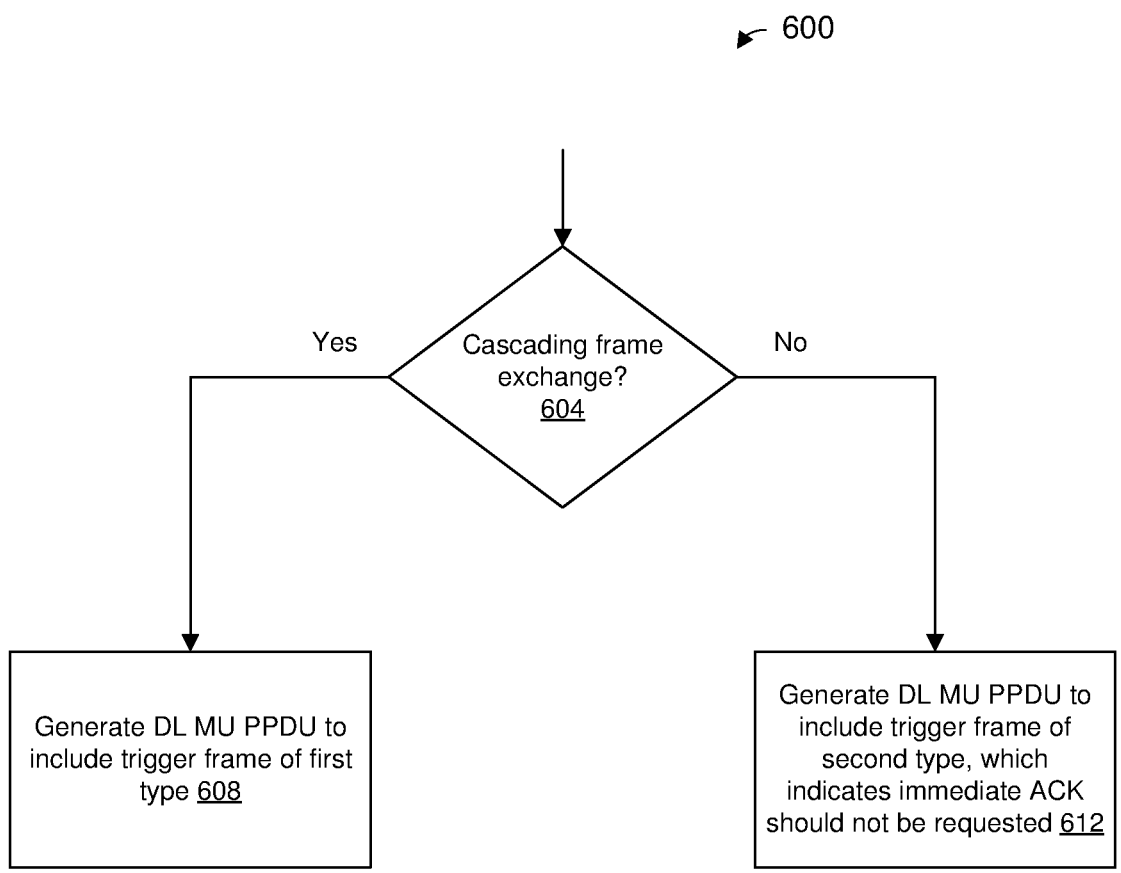
FIG. 6 is a flow diagram of an example method of generating a downlink (DL) MU transmission that includes a trigger frame, according to another embodiment.

FIG. 6 is a flow diagram of an example method 600 performed in connection with generating a DL MU PHY data unit (e.g., a PHY data unit that utilizes OFDMA and/or MU MIMO) for transmission in a wireless communication network, according to an embodiment. In an embodiment, the method 600 is implemented by the network interface device 122 of the AP 114 (FIG. 1), and the method 600 is described in the context of the WLAN 110 merely for explanatory purposes. In some embodiments, however, the method 600 is implemented in another suitable wireless communication network and/or with another suitable communication device.

At block 604, the communication device (e.g., the MAC processor 126 of the network interface device 122) determines whether the DL MU PHY data unit to be generated is (or will be) part of a cascading frame exchange. If the communication device determines that the DL MU PHY data unit to be generated is (or will be) part of a cascading frame exchange, the flow proceeds to block 608.

At block 608, the communication device (e.g., the network interface device 122) generates the DL MU PHY data unit to include a trigger frame of a first type. The trigger frame of the first type is configured to signal to other communication devices (e.g., client stations 154) that the other communication devices should include a request for an immediate acknowledgment in a UL data frame transmitted in response to the trigger frame. For example, the communication protocol according to which communication devices in the wireless network operate specifies that communication devices should include requests for immediate acknowledgment in UL data frames that are transmitted in response to the trigger frame of the first type, according to an embodiment. The first type of trigger frame is a basic trigger such as the example trigger frame discussed above in connection with FIGS. 4A-C, according to an embodiment. Block 608 includes setting a value of a trigger type field in the trigger frame, such as the trigger type field 440, to indicate the first type, according to an embodiment.

On the other hand, if the communication device determines that the DL MU PHY data unit to be generated is not (or will not be) part of a cascading frame exchange, the flow proceeds to block 612. At block 612, the communication device (e.g., the network interface device 122) generates the DL MU PHY data unit to include a trigger frame of a second type. The trigger frame of the second type is configured to signal to other communication devices (e.g., client stations 154) that the other communication devices should not include a request for an immediate acknowledgment in a UL data frame transmitted in response to the trigger frame. For example, the communication protocol according to which communication devices in the wireless network operate specifies that communication devices should not include requests for immediate acknowledgment in UL data frames that are transmitted in response to the trigger frame of the second type, according to an embodiment. The second type of trigger frame is a UL acknowledgment variant trigger such as the example trigger frame discussed above in connection with FIGS. 4A, 5A, and 5B, according to an embodiment. Block 612 includes setting a value of a trigger type field in the trigger frame, such as the trigger type field 440, to indicate the second type, according to an embodiment.

In an embodiment, blocks 608 and 612 also include generating the DL MU PHY data unit to include a plurality of DL data frames for multiple other communication devices (e.g., client stations 154). In an embodiment, blocks 608 and 612 include the MAC processor 126 (FIG. 1) generating the trigger frame and the plurality of DL data frames, and providing the trigger frame and the plurality of DL data frames to the PHY processor 130, which then generates a DL MU PHY data unit for transmission to a group of client stations 154. In other embodiments, another suitable communication device generates the DL MU PHY data unit.

In another embodiment, the determination at block 604 is whether UL data frames in UL MU PHY data units transmitted in response to a trigger frame in the DL MU PHY data unit should include a request for immediate acknowledgment. If UL data frames in UL MU PHY data units transmitted in response to a trigger frame in the DL MU PHY data unit should include a request for immediate acknowledgment, the flow proceeds to block 608. On the other hand, if UL data frames in UL MU PHY data units transmitted in response to a trigger frame in the DL MU PHY data unit should not include a request for immediate acknowledgment, the flow proceeds to block 612.

Figure 7:
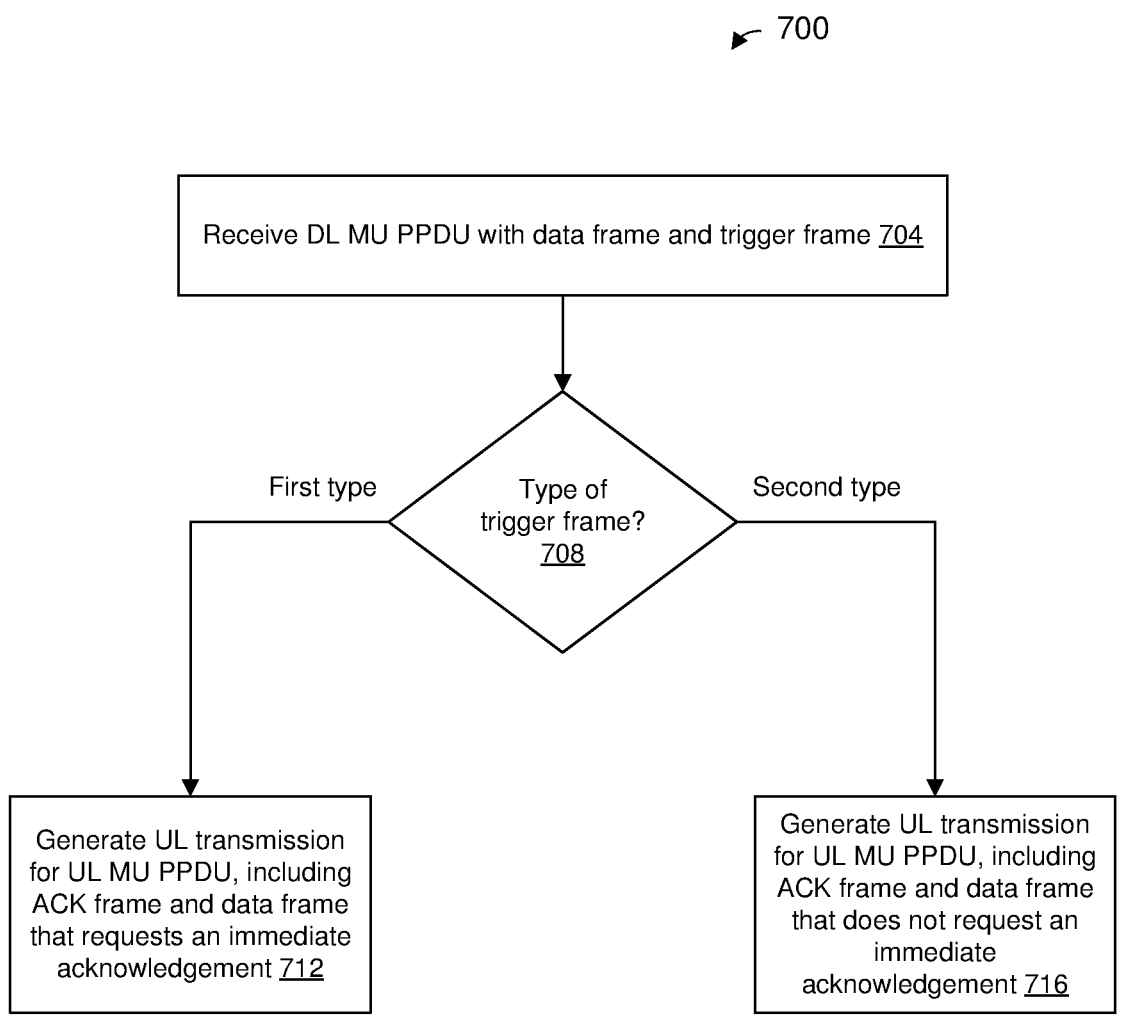
FIG. 7 is a flow diagram of an example method for generating an UL MU transmission in response to receiving a DL MU transmission that includes a trigger frame, according to an embodiment.

FIG. 7 is a flow diagram of an example method 700 performed in connection with generating a UL transmission for a UL MU PHY data unit (e.g., a PHY data unit that utilizes OFDMA and/or MU MIMO) for transmission in a wireless communication network, where the UL MU PHY data unit is to include i) an acknowledgment of a DL data frame and ii) a UL data frame, according to an embodiment. In an embodiment, the method 700 is implemented by the network interface device 162 of the client station 154-1 (FIG. 1), and the method 700 is described in the context of the WLAN 110 merely for explanatory purposes. In some embodiments, however, the method 700 is implemented in another suitable wireless communication network and/or with another suitable communication device.

At block 704, the communication device (e.g., the network interface device 162) receives a DL MU PHY data unit with i) a DL data frame addressed to the communication device and ii) a trigger frame. In an embodiment, block 704 includes the PHY processor 170 downconverting one or more RF signals corresponding to a DL MU PHY data unit received via one or more antennas 178, extracting a trigger frame and one or more DL data frames from the DL MU PHY data unit, and providing the trigger frame and the one or more DL data frames to the MAC processor 166.

At block 708, the communication device (e.g., the MAC processor 166 of the network interface device 162) determines whether the trigger frame in the received DL MU PHY data unit is a first type or a second type. The trigger frame of the first type indicates that the communication devices responding to the trigger frame should include a request for an immediate acknowledgment in a UL data frame transmitted in response to the trigger frame. For example, the communication protocol according to which communication devices in the wireless network operate specifies that communication devices should include requests for immediate acknowledgment in UL data frames that are transmitted in response to the trigger frame of the first type, according to an embodiment. The first type of trigger frame is a basic trigger such as the example trigger frame discussed above in connection with FIGS. 4A-C, according to an embodiment.

The trigger frame of the second type indicates that the communication devices responding to the trigger frame should not include a request for an immediate acknowledgment in a UL data frame transmitted in response to the trigger frame. For example, the communication protocol according to which communication devices in the wireless network operate specifies that communication devices should not include requests for immediate acknowledgment in UL data frames that are transmitted in response to the trigger frame of the second type, according to an embodiment. The second type of trigger frame is a UL acknowledgment variant trigger such as the example trigger frame discussed above in connection with FIGS. 4A, 5A, and 5B, according to an embodiment.

Block 708 includes analyzing a value of a trigger type field, such as the trigger type field 440, in the trigger frame in the received DL MU PHY data unit to determine whether the trigger frame is of the first type or the second type.

If the communication device determines at block 708 that the trigger frame is of the first type, the flow proceeds to block 712. At block 712, the communication device (e.g., the network interface device 162) generates the UL MU PHY data unit to include an acknowledgment frame and a UL data frame that includes a request for an immediate acknowledgment of the UL data frame.

On the other hand, if the communication device determines at block 708 that that the trigger frame is of the second type, the flow proceeds to block 716. At block 716, the communication device (e.g., the network interface device 162) generates the UL MU PHY data unit to include an acknowledgment frame and a UL data frame that does not include a request for an immediate acknowledgment of the UL data frame.

In an embodiment, blocks 712 and 716 include the MAC processor 166 (FIG. 1) generating the acknowledgment frame and the UL data frame, and providing the acknowledgment frame and the UL data frame to the PHY processor 170, which then generates a UL transmission as part of the UL MU PHY data unit for transmission to the AP 114. In other embodiments, another suitable communication device generates the UL transmission as part of the UL MU PHY data unit.

As discussed above in connection with FIGS. 2 and 3, the maximum duration of UL MU PHY data units for non-cascading frame exchanges is typically shorter than the maximum duration of UL MU PHY data units for cascading frame exchanges, at least in some embodiments. Thus, in some embodiments, instead of using first and second types of trigger frames as discussed above, a communication device determines whether to include a request for an immediate acknowledgment of a UL data frame based on an indicated duration of the UL MU PHY data unit in the trigger frame.

Figure 8:
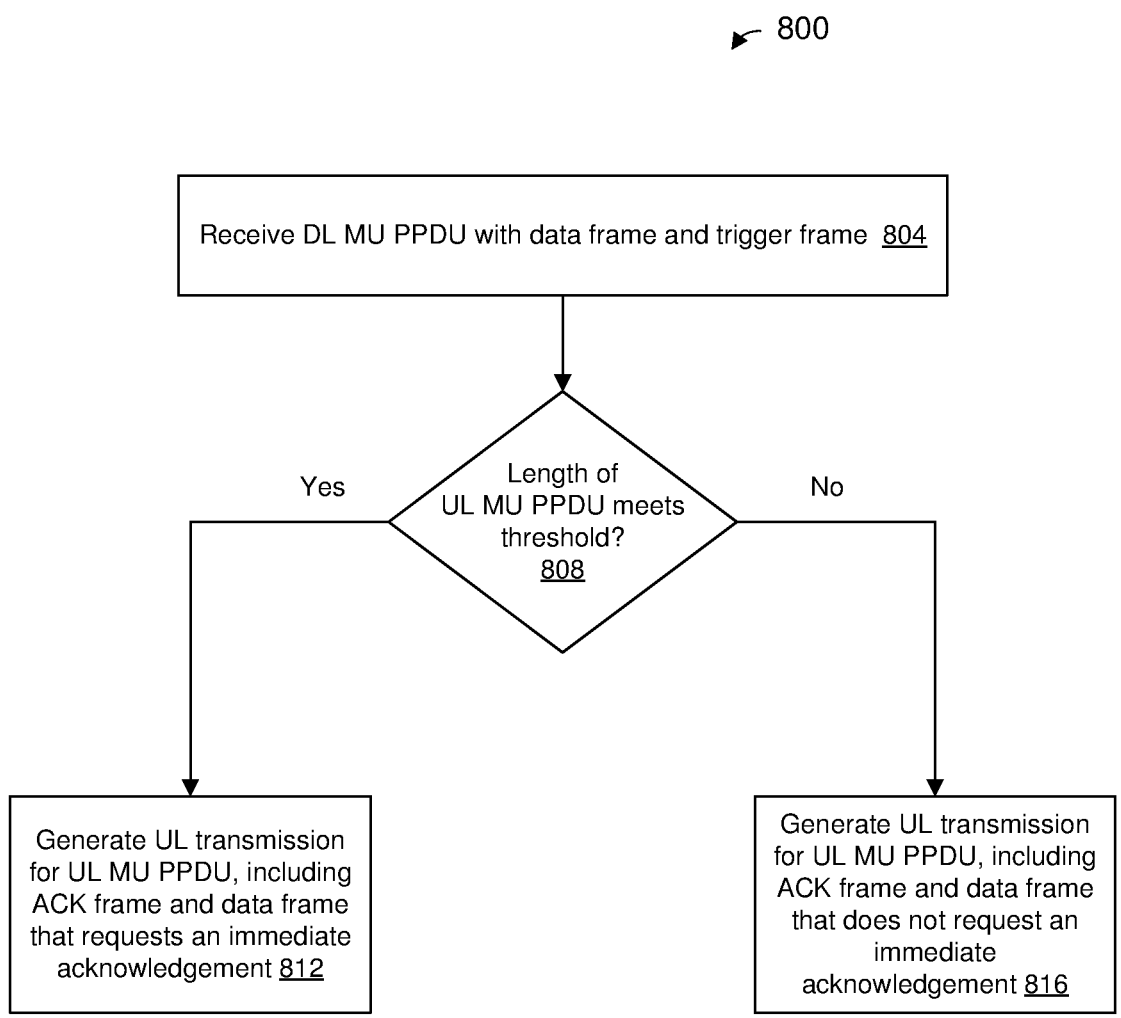
FIG. 8 is a flow diagram of another example method for generating an UL MU transmission in response to receiving a DL MU transmission that includes a trigger frame, according to another embodiment.

FIG. 8 is a flow diagram of an example method 800 performed in connection with generating a UL transmission for a UL MU PHY data unit (e.g., a PHY data unit that utilizes OFDMA and/or MU MIMO) for transmission in a wireless communication network, where the UL MU PHY data unit is to include i) an acknowledgment of a DL data frame and ii) a UL data frame, according to an embodiment. In an embodiment, the method 800 is implemented by the network interface device 162 of the client station 154-1 (FIG. 1), and the method 800 is described in the context of the WLAN 110 merely for explanatory purposes. In some embodiments, however, the method 800 is implemented in another suitable wireless communication network and/or with another suitable communication device.

At block 804, the communication device (e.g., the network interface device 162) receives a DL MU PHY data unit with i) a DL data frame addressed to the communication device and ii) a trigger frame. In an embodiment, block 704 includes the PHY processor 170 downconverting one or more RF signals corresponding to a DL MU PHY data unit received via one or more antennas 178, extracting a trigger frame and one or more DL data frames from the DL MU PHY data unit, and providing the trigger frame and the one or more DL data frames to the MAC processor 166.

At block 808, the communication device (e.g., the MAC processor 166 of the network interface device 162) determines whether a duration (e.g., a maximum duration) of the UL MU PHY data unit indicated in the trigger frame meets a threshold. As discussed in connection with FIG. 4B, a trigger frame includes a field (e.g., the length field 444 in the common information field 420) that indicates a duration (e.g., a maximum duration) of a UL MU PHY data unit that is to be transmitted in response to the trigger frame. Block 808 includes the communication device (e.g., the MAC processor 166 of the network interface device 162) determining whether the duration indicated by the length field in the trigger frame meets a threshold, according to an embodiment. Determining whether the duration indicated by the length field in the trigger frame meets the threshold includes determining whether the duration indicated by the length field in the trigger frame exceeds the threshold, in an embodiment. Determining whether the duration indicated by the length field in the trigger frame meets the threshold includes determining whether the duration indicated by the length field in the trigger frame is greater than or equal to the threshold, in an embodiment.

If the communication device determines at block 808 that the duration of the UL MU PHY data unit indicated in the trigger frame meets the threshold, the flow proceeds to block 812. At block 812, the communication device (e.g., the network interface device 162) generates the UL MU PHY data unit to include an acknowledgment frame and a UL data frame that includes a request for an immediate acknowledgment of the UL data frame.

On the other hand, if the communication device determines at block 808 that that the duration of the UL MU PHY data unit indicated in the trigger frame does not meet the threshold, the flow proceeds to block 816. At block 816, the communication device (e.g., the network interface device 162) generates the UL MU PHY data unit to include an acknowledgment frame and a UL data frame that does not include a request for an immediate acknowledgment of the UL data frame.

In an embodiment, blocks 812 and 816 include the MAC processor 166 (FIG. 1) generating the acknowledgment frame and the UL data frame, and providing the acknowledgment frame and the UL data frame to the PHY processor 170, which then generates a UL transmission as part of the UL MU PHY data unit for transmission to the AP 114. In other embodiments, another suitable communication device generates the UL transmission as part of the UL MU PHY data unit.

Figure 9A:
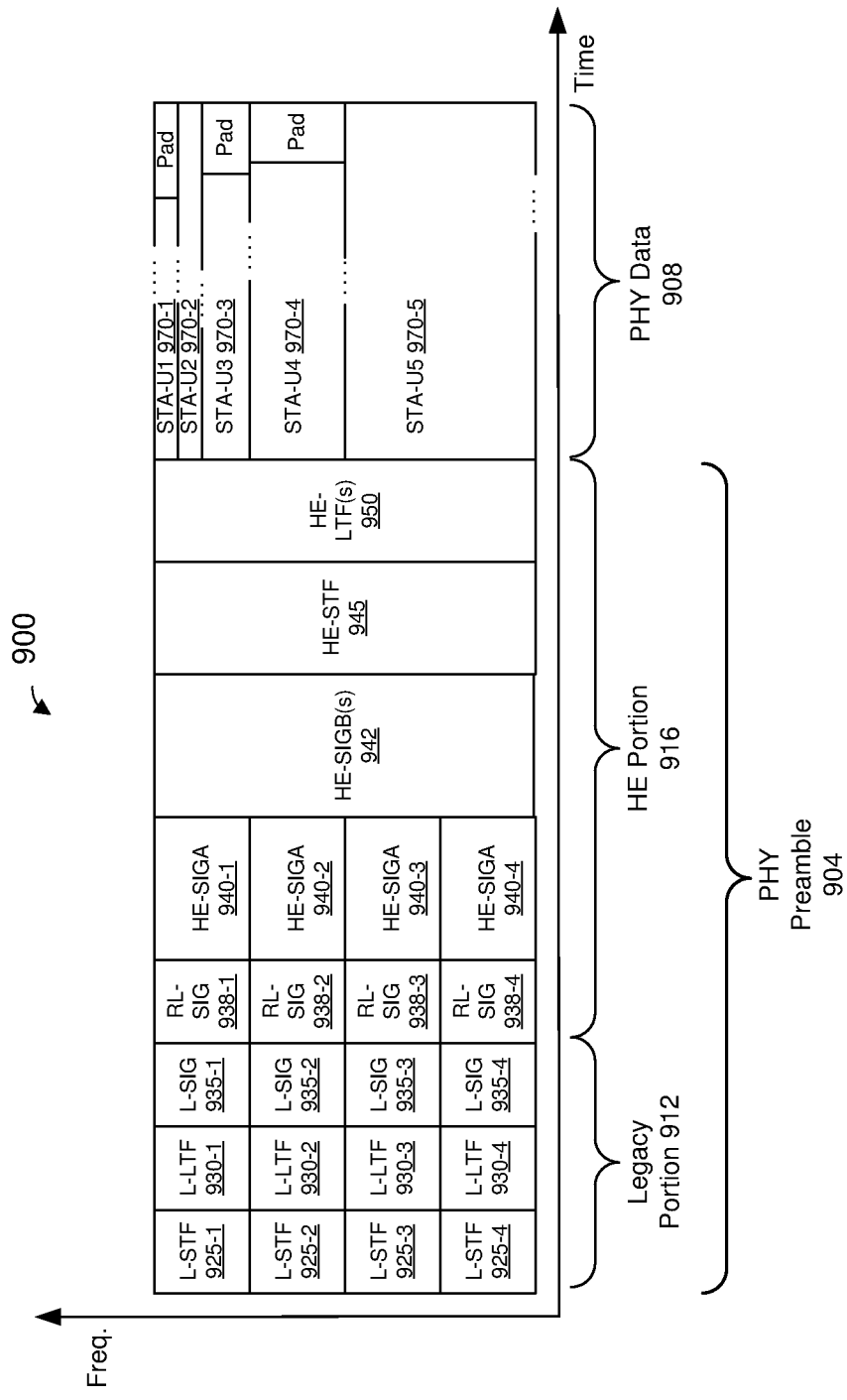
FIG. 9A is a diagram of an example DL MU physical layer (PHY) data unit that conforms to a wireless communication protocol, according to an embodiment.

FIG. 9A is a diagram of an example DL MU PHY data unit 900, according to an embodiment. In an embodiment, the network interface 122 (FIG. 1) is configured to generate the DL MU PHY data unit 900. The data unit 900 occupies an 80 MHz bandwidth. Data units similar to the data unit 900 occupy other suitable bandwidth such as 40 MHz, 120 MHz, 160 MHz, 320 MHz, 640 MHz, etc., for example, or other suitable bandwidths, in other embodiments.

In an embodiment, the data unit 900 includes independent data streams for multiple client stations 154 using respective sets of frequency RUs and, in some cases respective spatial streams, allocated to the client stations 154.

The data unit 900 includes a PHY preamble 904 and a PHY data portion 908. The PHY preamble 904 includes a legacy portion 912 and an HE portion 916. The PHY preamble 904 includes legacy short training fields (L-STFs) 925, legacy long training fields (L-LTFs) 930, legacy signal fields (L-SIGs) 935, repeated L-SIG fields (RL-SIGs) 938, high efficiency (HE) signal fields (HE-SIGAs) 940, one or more HE signal fields (HE-SIGBs) 942, an HE short training field (HE-STF) 945, and M HE long training fields (HE-LTFs) 950, where M is a suitable positive integer. In an embodiment, M generally corresponds to (e.g., is greater than or equal to) a number of spatial streams via which the data unit 900 will be transmitted.

In some embodiments, the preamble 904 omits one or more of the fields 925-950. In some embodiments, the preamble 904 includes additional fields not illustrated in FIG. 9A.

In some embodiments, each of the L-STF 925, the L-LTF 930, the L-SIG 935, the RL-SIG 938, and the HE-SIG-A 9400 is repeated over a corresponding number of 20 MHz sub-bands of the whole bandwidth of the data unit, in an embodiment.

In an embodiment, the HE-SIGA 940 generally carries information about the format of the data unit 900, such as information needed to properly decode at least a portion of the data unit 900, in an embodiment. In some embodiments, HE-SIGA 940 additionally includes information for receivers that are not intended receivers of the data unit 900, such as information needed for medium protection, spatial reuse, etc.

In an embodiment, the HE-SIGB(s) 942 include a plurality of HE-SIGBs repeated over a corresponding number of 20 MHz sub-bands of the whole bandwidth of the data unit. In another embodiment, the HE-SIG-B 942 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 900.

The HE-SIGAs 940 and the HE-SIGB(s) 942 generally carry information about the format of the data unit 900, such as information needed to properly decode at least a portion of the data unit 900, in an embodiment. The HE-SIGA 940 carries information commonly needed by multiple intended receivers of the data unit 900. On the other hand, the HE-SIGB(s) 942 carry user-specific information individually needed by each intended receiver of the data unit 900. In an embodiment, HE-SIGA 940 includes information needed to properly decode the HE-SIGB(s) 942, and HE-SIGBs 942 include information needed to properly decode data streams in the data portion 908 of the data unit 900.

The data portion 908 include data for different client stations 154 in different RUs. In the example of FIG. 9A, the data for the different client stations 154 are included in data subportions 970 corresponding to different frequency RUs. Trigger frames and DL data frames are included in data subportions such as the data subportions 970, according to an embodiment.

Referring now to FIG. 1, the MAC processor 126 is configured to determine allocation of RUs corresponding to different client stations 154 for the data portion 908, according to an embodiment. The MAC processor 126 is configured provide i) indications of the allocation of RUs, and ii) MAC data units (e.g., frames, MPDUs, A-MPDUs, etc.) to the PHY processor 130, according to an embodiment. The PHY processor 130 is configured to generate the DL MU PHY data unit according to the indicated RU allocations and to include the MAC data units provided by the MAC processor 126.

Figure 9B:
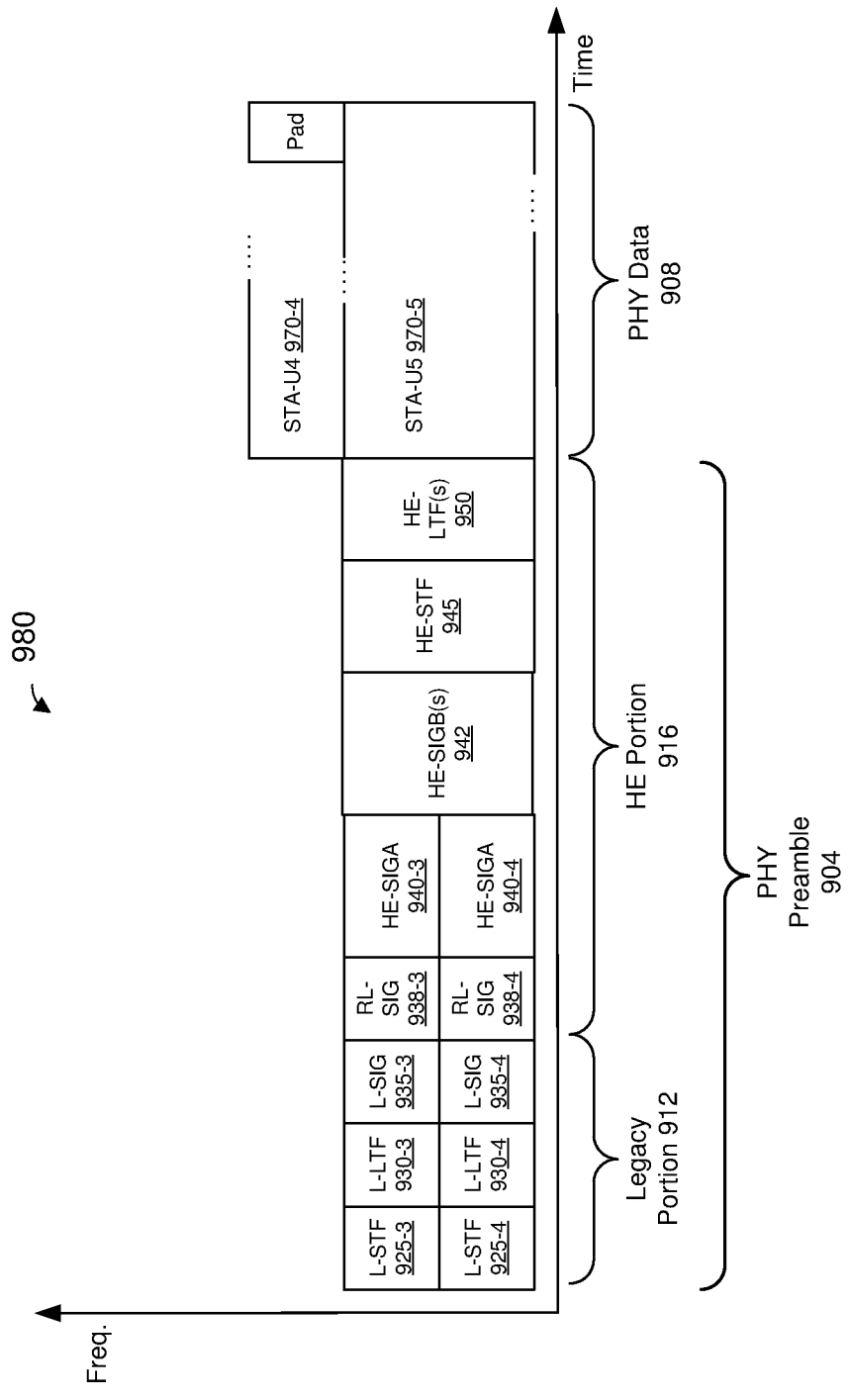
FIG. 9B is a diagram of an example DL MU physical layer (PHY) data unit that is prohibited by a wireless communication protocol, according to an embodiment.

To improve coexistence of proximate wireless networks and spatial reuse opportunities, the communication protocol according to which the AP 114 and the client stations 154 operate specifies that the AP 114 shall not allocate, in a DL MU PHY data unit, any RUs (or subchannels) in any 20 MHz channel that is not occupied by the PHY preamble of the DL MU PHY data unit, according to an embodiment. Thus, for example, FIG. 9B illustrates an example DL MU PHY data unit 980 that is not permitted by the communication protocol. In particular, the data 970-4 is in a 20 MHz channel that is not occupied by the PHY preamble 904. Thus, the network interface 122 (e.g., the MAC processor 126) is configured such that the network interface 122 (e.g., the MAC processor 126), when allocating RUs for a DL MU PHY data unit, cannot allocate any RUs (or subchannels) in any 20 MHz channel that will not be occupied by a PHY preamble of the DL MU PHY data unit, according to an embodiment.

Figure 9C:
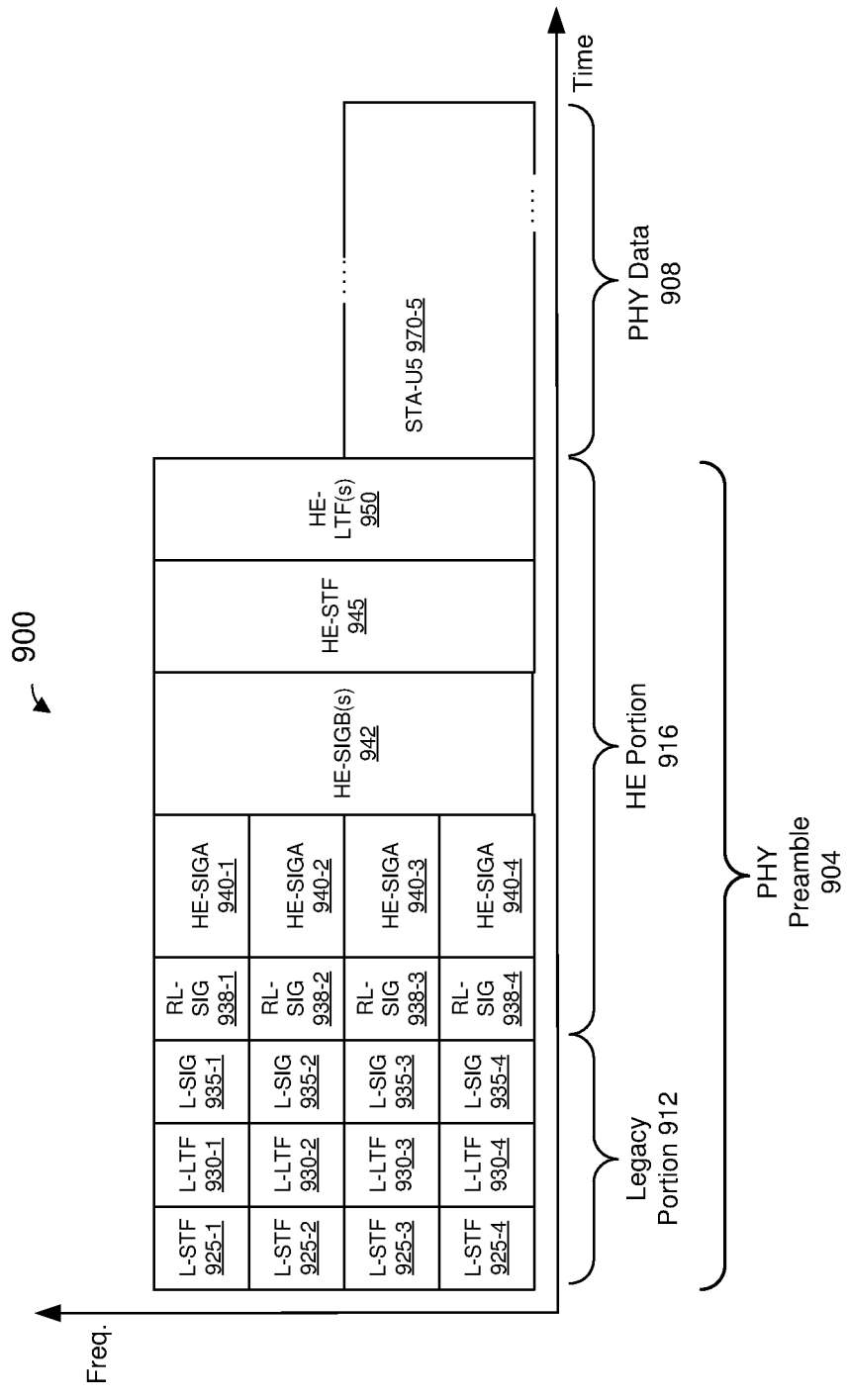
FIG. 9C is a diagram of another example DL MU physical layer (PHY) data unit that is prohibited by a wireless communication protocol, according to an embodiment.

According to an embodiment, the communication protocol according to which the AP 114 and the client stations 154 operate specifies that, for each 20 MHz channel that is occupied by the PHY preamble of the DL MU PHY data unit, the AP 114 shall allocate at least one RU (or subchannel). FIG. 9C illustrates an example DL MU PHY data unit 990 that is not permitted by the communication protocol. In particular, there are no DL data in two 20 MHz subchannels that are occupied by the PHY preamble 904. Thus, the network interface 122 (e.g., the MAC processor 126) is configured such that the network interface 122 (e.g., the MAC processor 126), when allocating RUs for a DL MU PHY data unit, must allocate at least one RU (or subchannel) in every 20 MHz channel that will be occupied by a PHY preamble of the DL MU PHY data unit, according to an embodiment.

In an embodiment, the AP 114 and the client stations 154 contend for a communication medium using carrier sense multiple access with collision avoidance (CSMA/CA) protocol or another suitable medium access protocol. In an embodiment, the AP 114 and the client stations 154 maintain respective network allocation vectors (NAVs) that include timers for tracking when another communication device has seized control or "ownership" of a wireless communication medium. For example, when a communication device (e.g., the AP 114 or a client station 154) receives a transmitted PHY data unit that conforms to a particular communication protocol (e.g., the IEEE 802.11 Standard, a future version of the IEEE 802.11 Standard, or another suitable communication protocol), the communication device examines duration information included in a header of the PHY data unit, where the duration information indicates a length of time that another communication device has taken ownership of a communication medium. The communication device then uses the duration information in the PHY data unit to set a NAV timer, and the NAV timer begins to decrement. When a value of the NAV timer is non-zero, this indicates that another communication device owns the communication medium and that the communication device therefore should generally refrain from transmitting. On the other hand, when the value of the NAV timer reaches zero, this indicates that the communication medium is not currently owned by another communication device.

In an embodiment, the communication device (e.g., the AP 114 and the client stations 154) employs a clear channel assessment (CCA) procedure when the NAV is zero. In the CCA procedure, the communication device (e.g., an AP 114, a client station 154) determines an energy level of the medium in order to determine whether the medium is busy or idle. While the communication device determines that the medium is idle, the communication device decrements a backoff timer. When the communication device determines that the communication medium is busy, the communication device pauses the backoff timer and does not resume decrementing the backoff timer until the communication medium is subsequently determined to be idle. The backoff timer is set to a value chosen randomly or pseudo-randomly so that backoff timers of different communication devices in the network tend to reach zero at different times. Generally, if the communication medium is still idle when the backoff timer reaches zero, the communication device determines that the communication device is free to transmit. On the other hand, if the communication medium is busy when the backoff timer reaches zero, the communication device resets the backoff timer and the process repeats.

Any suitable threshold energy level may be utilized. The threshold energy level for determining whether the medium is idle or busy may be different depending on the bandwidth of the channel being used by the communication device and/or on whether the energy corresponds to a transmission that conforms to a wireless communication protocol, according to some embodiments. For example, in the communication protocol defined by the IEEE 802.11 Standard, if the channel bandwidth is 20 Megahertz (MHz), the threshold level is −82 decibel-milliwatts (dBm) for energy from transmissions that conform to the IEEE 802.11 Standard (referred to as "valid 802.11" signals). For channel bandwidths of 40 MHz, 80 MHz, and 160 MHz, the threshold levels are −79 dBm, −76 dBm, and −73 dBm, respectively. For energy of signals not identified by the communication device as a valid 802.11 signal, the threshold level is −62 dBm, according to the IEEE 802.11 Standard.

Figure 10:
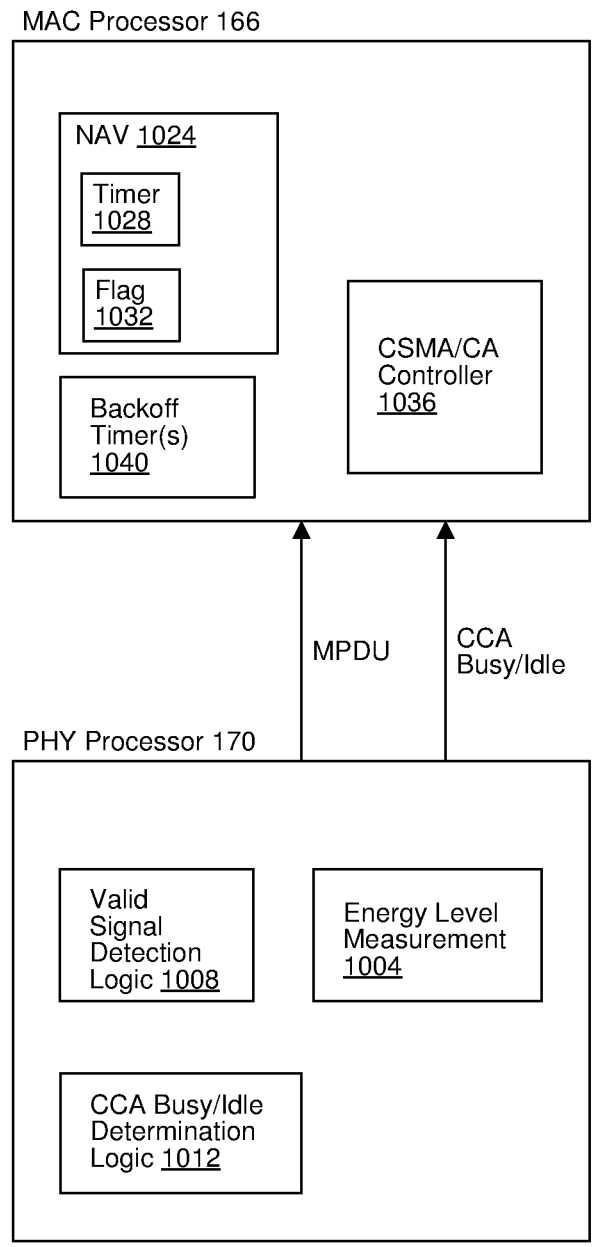
FIG. 10 is a block diagram of example carrier sense multiple access with collision avoidance (CSMA/CA)-related and clear channel assessment (CCA)-related components of a client station of FIG. 1, according to an embodiment.

FIG. 10 is a block diagram illustrating CSMA/CA- and CCA-related components of the MAC processor 166 and the PHY processor 170 of the client station 154-1, according to an embodiment. The CSMA/CA- and CCA-related components are used for determining whether a particular communication channel is idle in a system such as the WLAN 110, according to some embodiments. In some embodiments, the MAC processor 126 and the PHY processor 130 of the AP 114 include the same or similar CSMA/CA- and CCA-related components.

The PHY processor 170 includes an energy level measurement circuit 1004 configured to measure an energy level of the communication medium. The PHY processor 170 also includes a logic device 1008 configured to detect whether a received signal is a signal that conforms to a wireless communication protocol (e.g., is a valid 802.11 signal). In an embodiment, the logic device 1008 is configured to detect whether a received signal includes a PHY preamble and/or PHY header that conforms to the wireless communication protocol (e.g., a protocol that conforms to the IEEE 802.11 Standard, a protocol that conforms to a version of the IEEE 802.11 Standard not yet approved, or another suitable wireless communication protocol). In an embodiment, determining whether a PHY header in a received signal conforms to the wireless communication protocol includes one or both of i) determining whether at least a portion of the PHY header has a format that conforms to the wireless communication protocol, and ii) determining whether at least a portion of the PHY header includes data that is valid according to the wireless communication protocol. In an embodiment, the logic device 208 comprises a hardware state machine circuit and/or a processor executing machine readable instructions.

The PHY processor 170 also includes a logic device 1012 configured to determine whether the communication medium is i) idle or ii) busy. For example, in an embodiment, the logic device 1012 is configured to compare the energy level of the channel medium, as measured by the circuit 1004, to an energy level threshold to determine whether the communication medium is i) idle or ii) busy. If the measured energy level is above the threshold, the logic device 1012 determines that the channel medium is busy, and if the measured energy level is below the threshold, the logic device 1012 determines that the channel medium is idle. In some embodiments, the energy level threshold used by the logic device 1012 varies depending on, for example, i) whether there is a valid 802.11 signal detected by the logic device 208, ii) a bandwidth of a channel that is being monitored, etc. For signals that are not valid 802.11 signals, the logic device 1012 uses a suitable first energy level threshold, according to some embodiments. For signals that are valid 802.11 signals, the logic device 1012 uses a suitable second energy level threshold, according to some embodiments, where the second energy level threshold is higher than the first energy level threshold. In an embodiment, the logic device 1012 comprises a hardware state machine circuit and/or a processor executing machine readable instructions.

The PHY processor 170 is configured to generate an indication of whether the channel medium is busy or idle (e.g., a CCA busy/idle signal), and provide the indication to the MAC processor 166. For example, in an embodiment, the logic device 1012 is configured to generate the CCA busy/idle signal.

The MAC processor 166 includes a NAV 1024. The NAV 1024 includes a timer 1028 and a flag 1032. The flag 1032 comprises a memory device such as a register, a storage location in a memory such as a random access memory (RAM), etc. As will be described below, the flag 1032 indicates whether the timer 1028 was set in response to a communication from the wireless communication network 110 or another wireless communication network such as a neighboring network that is proximate to the communication network 110.

When the client station 154 receives a PHY data unit, the MAC processor 166 uses duration information included in the PHY data unit to set the NAV timer 1028. The NAV timer 1028 then decrements over time such that the NAV timer 1028 reaches zero after a time period that corresponds to the duration information included in the PHY data unit. The controller 1036 sets a value of the flag 1032 is according to whether the PHY data unit was from the communication network 110 or from another communication network. In an embodiment, the network interface device 122 examines a color field in the PHY preamble of the PHY data unit (e.g., in an HE-SIGA field in the PHY preamble) to determine whether the PHY data unit was from the communication network 110 or from another communication network. In an embodiment, the color field includes an identifier of a communication network to which the communication device that transmitted the PHY data unit belongs, and the network interface device 122 compares a value of the color field in the PHY preamble of the PHY data unit to an identifier of the communication network 110 to determine the PHY data unit was from the communication network 110 or from another communication network. In an embodiment, if the network interface device 122 is unable to determine whether the PHY data unit is from the communication network 110 (e.g., the PHY preamble of the PHY data unit does not include the color field), the controller 1036 sets a value of the flag 1032 to a value corresponding to a transmission from another communication network.

In an embodiment, the NAV 1024 includes a counter circuit for implementing the NAV timer 1028.

The MAC processor 166 also includes a CSMA/CA controller 1036 configured to control one or more backoff timers 1040 and to use the NAV 1024 and the backoff timer(s) 1040 and to determine when the client station 154-1 is permitted to transmit, as will described in more detail below.

According to an embodiment, for non-trigger-based UL communications, when the client station 154-1 has data to transmit, the controller 1036 determines whether there is the NAV timer 1028 is zero. If the controller 1036 determines the NAV timer 1028 is non-zero, the client station 154-1 is not permitted to transmit. On the other hand, if the controller 1036 determines the NAV timer 1028 is zero, the controller 1036 utilizes a backoff process to determine if and when the client station 154-1 can transmit.

For example, in an embodiment, the backoff process includes setting the backoff timer 1040 and then checking the CCA busy/idle signal during each of a plurality of time slots. When the CCA busy/idle indicates the channel is idle during a particular time slot, the controller 1036 decrements the backoff timer 1040. On the other hand, when the CCA busy/idle indicates the channel is busy during a particular time slot, the controller 1036 does not decrement the backoff timer 1040. When i) the backoff timer 1040 is zero, ii) the channel is idle, and iii) the NAV timer 1028 is zero, the controller 1036 determines that the client station 154-1 is permitted to transmit, according to an embodiment. On the other hand, when the backoff timer 1040 reaches zero and the controller 1036 determines that the channel is busy, the controller 1036 resets the backoff timer 1040 and the backoff procedure repeats, according to an embodiment.

In an embodiment, each backoff timer 1040 includes a counter circuit. In an embodiment, the controller 1036 comprises a hardware state machine circuit, a logic circuit, and/or a processor executing machine readable instructions.

On the other hand, when the client station 154-1 is to participate in an UL MU transmission in response to a trigger frame, the controller 1036 determines whether the NAV timer 1028 is zero and whether the flag 1032 is set to indicate the NAV timer 1028 was set based on a transmission from the network 110. If the controller 1036 determines the NAV timer 1028 non-zero and the flag 1032 is set to indicate the NAV timer 1028 was set based on a transmission from the network 110, the client station 154-1 is not permitted to transmit. On the other hand, if the controller 1036 determines the NAV timer 1028 is zero or the flag 1032 is set to indicate the NAV timer 1028 was set based on a transmission from another network, the controller 1036 determines that the client station 154-1 can transmit.

In an embodiment, when a communication device wishes to relinquish control of the communication medium prior to when NAV timers of other communication devices will expire, the communication device transmits a control frame, sometimes referred to as a contention free end (CF-End) frame. When the client station 154 receives a CF-END frame and determines that the CF-END frame is from the network 110, the controller 1036 will reset the timer 1028 to zero if the flag 1032 is set to indicate the NAV timer 1028 was previously set based on a transmission from the network 110, and will not reset the timer 1028 to zero if the flag 1032 is set to indicate the NAV timer 1028 was previously set based on a transmission from another network, according to an embodiment. On the other hand, when the client station 154 receives a CF-END frame and determines that the CF-END frame is from another network, the controller 1036 will reset the timer 1028 to zero if the flag 1032 is set to indicate the NAV timer 1028 was previously set based on a transmission from another network, and will not reset the timer 1028 to zero if the flag 1032 is set to indicate the NAV timer 1028 was previously set based on a transmission from the network 110, according to an embodiment. When the client station 154 receives a CF-END frame and cannot determine whether the CF-END frame is from the network 110 or another network, the controller 1036 will reset the timer 1028 to zero if the flag 1032 is set to indicate the NAV timer 1028 was previously set based on a transmission from another network, and will not reset the timer 1028 to zero if the flag 1032 is set to indicate the NAV timer 1028 was previously set based on a transmission from the network 110, according to an embodiment. In another embodiment, when the client station 154 receives a CF-END frame and cannot determine whether the CF-END frame is from the network 110 or another network, the controller 1036 will not reset the timer 1028 to zero.

Figure 11:
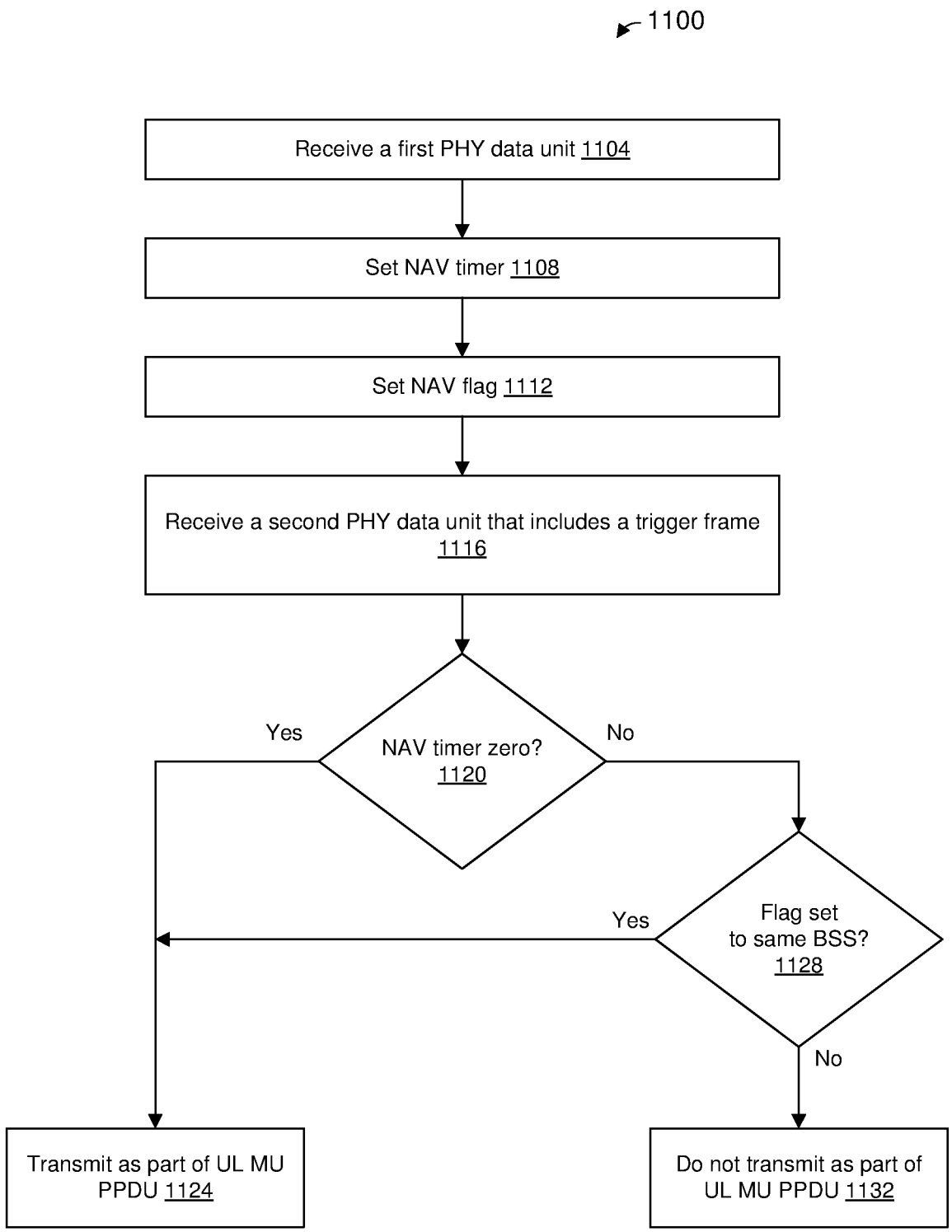
FIG. 11 is a flow diagram of an example method for determining whether to transmit an UL MU transmission in response to receiving a DL MU transmission that includes a trigger frame, according to another embodiment.

FIG. 11 is a flow diagram of an example method 1100 of determining whether a communication device can transmit as part of a MU UL transmission, according to an embodiment. In an embodiment, the method 1100 is implemented by the network interface device 162 (FIG. 1) and uses at least some of the CSMA/CA- and CCA-related components illustrated in FIG. 10. Thus, the method 1100 is described with reference to FIGS. 1 and 10 for ease of explanation. In other embodiments, however, the method 1100 is implemented by another suitable network interface device. Similarly, in some embodiments, the network interface device 162 (FIG. 1) and the CSMA/CA- and CCA-related components illustrated in FIG. 10 do not implement the method 1100.

At block 1104, a first PHY data unit is received by a communication device (e.g., the client station 154-1 or another suitable communication device). For example, the network interface device 162 receives the first PHY data unit via the antenna(s) 178. In an embodiment, block 1104 includes the PHY processor 170 downconverting one or more RF signals corresponding to the first PHY data unit.

At block 1108, the network interface device 162 (e.g., the controller 1036) sets a NAV timer (e.g., NAV timer 1024) in connection with receiving the first PHY data unit at block 1104, where the NAV timer indicates that another communication device is using a communication medium. In an embodiment, block 1108 includes setting a timer of the NAV using duration information included in a field of a header of the first PHY data unit. In an embodiment, the duration information in the header of the first PHY data unit indicates a length of time that the communication medium is expected to be used.

At block 1112, the network interface device 162 (e.g., the controller 1036) sets a NAV flag (e.g., the NAV flag 1032) according to whether the first PHY data unit is from the same communication network as the network interface device 162 ("same basic service set" or same BSS) or a different communication network ("other BSS" or "OBSS"). For example, in an embodiment, if the network interface device 162 determines that the first PHY data unit is from the same BSS, the network interface device 162 (e.g., the controller 1036) sets the NAV flag (e.g., the NAV flag 1032) to a first value (e.g., "true"); but if the network interface device 162 determines that the first PHY data unit is from an OBSS, the network interface device 162 (e.g., the controller 1036) sets the NAV flag (e.g., the NAV flag 1032) to a second value (e.g., "false"). In an embodiment, if the network interface device 162 cannot determine whether the first PHY data unit is from the same BSS or an OBSS, the network interface device 162 (e.g., the controller 1036) sets the NAV flag (e.g., the NAV flag 1032) to the second value (e.g., "false"). In an embodiment, block 1112 includes comparing a value in a color field of a preamble of the first PHY data unit with a color value (identifier) of the communication network to which the network interface 162 belongs.

At block 1116, the network interface device 162 receives a second PHY data unit from the AP 114, the second PHY data unit including a trigger frame configured to prompt the network interface device 162 to transmit as part of a UL MU PHY data unit. For example, the network interface device 162 receives the second PHY data unit via the antenna(s) 178. In an embodiment, block 1116 includes the PHY processor 170 downconverting one or more RF signals corresponding to the second PHY data unit, extracting the trigger frame, and providing the trigger frame to the MAC processor 166.

At block 1120, the network interface device 162 (e.g., the controller 1036) examines the NAV timer (e.g., NAV timer 1024) to determine if the NAV timer is zero. If the network interface device 162 (e.g., the controller 1036) determines that the NAV timer (e.g., NAV timer 1024) is zero, the flow proceeds to block 1124. At block 1124, the network interface device 162 generates an UL transmission as part of the UL MU PPDU.

On the other hand, if the network interface device 162 (e.g., the controller 1036) determines that the NAV timer (e.g., NAV timer 1024) is non-zero, the flow proceeds to block 1128. At block 1128, the network interface device 162 determines whether the NAV flag (e.g., the NAV flag 1032) is set to a value that indicates the NAV timer was set in connection with a transmission from the same BSS, e.g., the network interface device 162 determines whether the NAV flag is set to true. If the network interface device 162 determines that the NAV flag (e.g., the NAV flag 1032) is set to the value that indicates the NAV timer was set in connection with a transmission from the same BSS, the flow proceeds to block 1124, and the network interface device 162 generates an UL transmission as part of the UL MU PPDU.

On the other hand, if the network interface device 162 determines that the NAV flag (e.g., the NAV flag 1032) is set to the value that indicates the NAV timer was set in connection with a transmission from an OBSS, the flow proceeds to block 1132. At block 1132, the network interface device does not transmit as part of the UL MU PPDU.

Figure 12:
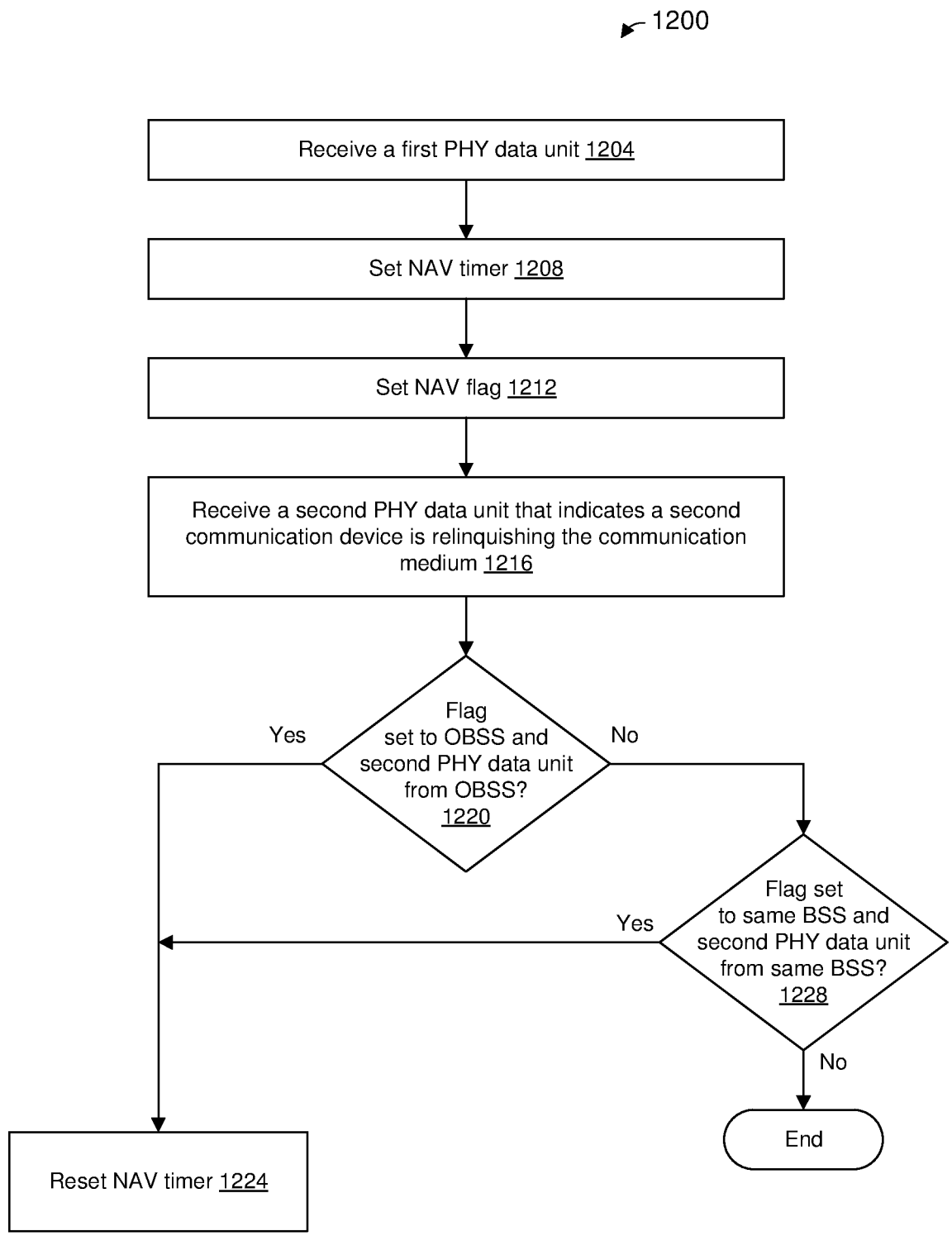
FIG. 12 is a flow diagram of an example method for determining whether to reset a network allocation vector (NAV) timer in response to receiving a PHY data unit that indicates another communication device is relinquishing a communication medium, according to another embodiment.

FIG. 12 is a flow diagram of an example method 1200 of managing a NAV timer, according to an embodiment. In an embodiment, the method 1200 is implemented by the network interface device 162 (FIG. 1) and uses at least some of the CSMA/CA- and CCA-related components illustrated in FIG. 10. Thus, the method 1200 is described with reference to FIGS. 1 and 10 for ease of explanation. In other embodiments, however, the method 1200 is implemented by another suitable network interface device. Similarly, in some embodiments, the network interface device 162 (FIG. 1) and the CSMA/CA- and CCA-related components illustrated in FIG. 10 do not implement the method 1200.

At block 1204, a first PHY data unit is received by a communication device (e.g., the client station 154-1 or another suitable communication device). For example, the network interface device 162 receives the first PHY data unit via the antenna(s) 178. In an embodiment, block 1204 includes the PHY processor 170 downconverting one or more RF signals corresponding to the first PHY data unit.

At block 1208, the network interface device 162 (e.g., the controller 1036) sets a NAV timer (e.g., NAV timer 1024) in connection with receiving the first PHY data unit at block 1104, where the NAV timer indicates that another communication device is using a communication medium. In an embodiment, block 1208 includes setting a timer of the NAV using duration information included in a field of a header of the first PHY data unit. In an embodiment, the duration information in the header of the first PHY data unit indicates a length of time that the communication medium is expected to be used.

At block 1212, the network interface device 162 (e.g., the controller 1036) sets a NAV flag (e.g., the NAV flag 1032) according to whether the first PHY data unit is from the same communication network as the network interface device 162 ("same basic service set" or same BSS) or a different communication network ("other BSS" or "OBSS"). For example, in an embodiment, if the network interface device 162 determines that the first PHY data unit is from the same BSS, the network interface device 162 (e.g., the controller 1036) sets the NAV flag (e.g., the NAV flag 1032) to a first value (e.g., "true"); but if the network interface device 162 determines that the first PHY data unit is from an OBSS, the network interface device 162 (e.g., the controller 1036) sets the NAV flag (e.g., the NAV flag 1032) to a second value (e.g., "false"). In an embodiment, if the network interface device 162 cannot determine whether the first PHY data unit is from the same BSS or an OBSS, the network interface device 162 (e.g., the controller 1036) sets the NAV flag (e.g., the NAV flag 1032) to the second value (e.g., "false"). In an embodiment, block 1212 includes comparing a value in a color field of a preamble of the first PHY data unit with a color value (identifier) of the communication network to which the network interface 162 belongs.

At block 1216, the network interface device 162 receives a second PHY data unit that indicates another communication device is relinquishing control of the communication medium. For example, the second PHY data unit includes a CF-END frame. In an embodiment, block 1216 includes the PHY processor 170 downconverting one or more RF signals corresponding to the second PHY data unit, extracting the CF-END frame, and providing the CF-END frame to the MAC processor 166.

At block 1220, the network interface device 162 determines whether a first condition is true: both i) the NAV flag (e.g., the NAV flag 1032) is set to a value that indicates the NAV timer was set in connection with a transmission from an OBSS, e.g., the network interface device 162 determines whether the NAV flag is set to false, and ii) the second PHY data unit was from an OBSS. If the network interface device 162 determines that the first condition is true, the flow proceeds to block 1224. At block 1224, the network interface device 162 (e.g., the controller 1036) resets the NAV timer (e.g., the timer 1028) to zero.

On the other hand, if the network interface device 162 determines at block 1220 that the first condition is not true, the flow proceeds to block 1228. At block 1228, the network interface device determines whether a second condition is true: both i) the NAV flag (e.g., the NAV flag 1032) is set to a value that indicates the NAV timer was set in connection with a transmission from the same BSS, e.g., the network interface device 162 determines whether the NAV flag is set to true, and ii) the second PHY data unit was from the same BSS. If the network interface device 162 determines that the second condition is true, the flow proceeds to block 1224 at which the NAV timer is reset to zero.

On the other hand, if the network interface device 162 determines at block 1228 that the second condition is not true, the flow ends and the NAV timer is not reset in response to the second PHY data unit received at block 1216.

Two or more of the various embodiments of methods and apparatus described above may be utilized in combination.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc.

The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for determining whether a wireless communication medium is idle, the method comprising:
    wirelessly receiving, at a first wireless communication device, a packet from a second wireless communication device, the packet including information indicating that the second wireless communication device is relinquishing control of the wireless communication medium;
    determining, at the first wireless communication device, whether the packet was transmitted in a wireless network to which the first wireless communication device belongs;
    determining, at the first wireless communication device, whether a network allocation vector (NAV) timer of the first wireless communication device was most recently set in connection with a transmission from the wireless network to which the first wireless communication device belongs, the NAV timer indicating whether the wireless communication medium is idle;
    in response to determining that i) the packet was transmitted in the wireless network to which the first wireless communication device belongs, and ii) the NAV timer was most recently set in connection with a transmission from another wireless network to which the first wireless communication device does not belong, determining, at the first wireless communication device, that the NAV timer will not be reset in response to receiving the packet;
    in response to determining that i) the packet was not transmitted in the wireless network to which the first wireless communication device belongs, and ii) the NAV timer was most recently set in connection with the transmission from the wireless network to which the first wireless communication device belongs, determining, at the first wireless communication device, that the NAV timer will not be reset in response to receiving the packet;
    wherein determining whether the NAV timer was most recently set in connection with the transmission from the wireless network to which the first wireless communication device belongs comprises examining a flag associated with the NAV timer, the flag indicating whether the NAV timer was most recently set in connection with the transmission from the wireless network to which the first wireless communication device belongs;
    wherein the packet is a first packet, and wherein the method further comprises,
    wirelessly receiving, at the first wireless communication device, a second packet prior to wirelessly receiving the first packet;
    determining, at the first wireless communication device, whether the second packet was transmitted in the wireless network to which the first wireless communication device belongs;
    in response to wirelessly receiving the second packet, setting the NAV timer of the first wireless communication device;
    in connection with setting the NAV timer, setting the flag to a first value when the second packet is determined to have been transmitted in the wireless network to which the first wireless communication device belongs; and
    in connection with setting the NAV timer, setting the flag to a second value when the second packet is determined to be transmitted in another wireless network to which the first wireless communication device does not belong.

2. The method of claim 1, further comprising:
    in response to determining that i) the packet was transmitted in the wireless network to which the first wireless communication device belongs, and ii) the NAV timer was most recently set in connection with the transmission from the wireless network to which the first wireless communication device belongs, resetting the NAV timer in response to receiving the packet; and
    in response to determining that i) the packet was not transmitted in the wireless network to which the first wireless communication device belongs, and ii) the NAV timer was most recently set in connection with a transmission from another wireless network to which the first wireless communication device does not belong, resetting the NAV timer in response to receiving the packet.

3. The method of claim 1, wherein:
    the packet from the second wireless communication device comprises a contention free end (CF-END) frame that indicates the second wireless communication device is relinquishing control of the wireless communication medium; and
    determining that the NAV timer will not be reset comprises determining that the NAV timer will not be reset in response to receiving the CF-END frame.

4. The method of claim 1:
    wherein determining whether the NAV timer was most recently set in connection with the transmission from the wireless network to which the first wireless communication device belongs comprises determining whether the flag is set to the first value.

5. The method of claim 1,
    wherein the method further comprises:
    determining, at the first wireless communication device, that the first wireless communication device is to transmit a third packet in the wireless network to which the first wireless communication device belongs;
    determining, at the first wireless communication device, whether the NAV timer is zero;
    in response to determining that i) the NAV timer is not zero, and ii) the NAV timer was most recently set in connection with a transmission from another wireless network to which the first wireless communication device does not belong, transmitting, by the first wireless communication device, the third packet.

6. The method of claim 5, further comprising:
    in response to determining that i) the NAV timer is not zero, and ii) the NAV timer was most recently set in connection with the transmission from the wireless network to which the first wireless communication device belongs, determining, at the first wireless communication device, that the third packet is not to be transmitted while the NAV timer is not zero.

7. A first wireless communication device, comprising:
a wireless network interface device comprising: one or more integrated circuit (IC) devices, and a network allocation vector (NAV) timer implemented on the one or more IC devices, wherein the NAV timer indicates whether a wireless communication medium is idle, and wherein the one or more IC devices are configured to:
receive a packet that was wirelessly transmitted from a second wireless communication device, the packet including information indicating that the second wireless communication device is relinquishing control of the wireless communication medium,
determine whether the packet was transmitted in a wireless network to which the first wireless communication device belongs,
determine whether the NAV timer was most recently set in connection with a transmission from the wireless network to which the first wireless communication device belongs,
in response to determining that i) the packet was transmitted in the wireless network to which the first wireless communication device belongs, and ii) the NAV timer was most recently set in connection with a transmission from another wireless network to which the first wireless communication device does not belong, determine that the NAV timer will not be reset in response to receiving the packet,
in response to determining that i) the packet was not transmitted in the wireless network to which the first wireless communication device belongs, and ii) the NAV timer was most recently set in connection with the transmission from the wireless network to which the first wireless communication device belongs, determine that the NAV timer will not be reset in response to receiving the packet;
wherein the wireless network interface device further comprises a memory device to store a flag associated with the NAV timer, the memory device implemented on the one or more IC devices, wherein the flag indicates whether the NAV timer was most recently set in connection with the transmission from the wireless network to which the first wireless communication device belongs;
wherein the one or more IC devices are further configured to examine the flag associated with the NAV timer in the memory device to determine whether the NAV timer was most recently set in connection with the transmission from the wireless network to which the first wireless communication device belongs;
wherein the packet is a first packet, and wherein the one or more IC devices are further configured to,
receive a second packet prior to receiving the first packet;
determine whether the second packet was transmitted in the wireless network to which the first wireless communication device belongs;
in response to wirelessly receiving the second packet, set the NAV timer of the first wireless communication device;
in connection with setting the NAV timer, set the flag in the memory device to a first value when the second packet is determined to have been transmitted in the wireless network to which the first wireless communication device belongs; and
in connection with setting the NAV timer, set the flag in the memory device to a second value when the second packet is determined to be transmitted in another wireless network to which the first wireless communication device does not belong.

8. The first wireless communication device of claim 7, wherein the one or more IC devices are further configured to:
in response to determining that i) the packet was transmitted in the wireless network to which the first wireless communication device belongs, and ii) the NAV timer was most recently set in connection with the transmission from the wireless network to which the first wireless communication device belongs, reset the NAV timer in response to receiving the packet; and
in response to determining that i) the packet was not transmitted in the wireless network to which the first wireless communication device belongs, and ii) the NAV timer was most recently set in connection with a transmission from another wireless network to which the first wireless communication device does not belong, reset the NAV timer in response to receiving the packet.

9. The first wireless communication device of claim 7, wherein the packet from the second wireless communication device comprises a contention free end (CF-END) frame that indicates the second wireless communication device is relinquishing control of the wireless communication medium, and wherein the one or more IC devices are configured to:
in response to determining that i) the packet was transmitted in the wireless network to which the first wireless communication device belongs, and ii) the NAV timer was most recently set in connection with a transmission from another wireless network to which the first wireless communication device does not belong, determine that the NAV timer will not be reset in response to receiving the CF-END frame; and
in response to determining that i) the packet was not transmitted in the wireless network to which the first wireless communication device belongs, and ii) the NAV timer was most recently set in connection with the transmission from the wireless network to which the first wireless communication device belongs, determine that the NAV timer will not be reset in response to receiving the CF-END frame.

10. The first wireless communication device of claim 7:
wherein the one or more IC devices are further configured to determine whether the NAV timer was most recently set in connection with the transmission from the wireless network to which the first wireless communication device belongs based on determining whether the flag is set to the first value.

11. The first wireless communication device of claim 7, wherein the one or more IC devices are further configured to:
determine that the first wireless communication device is to transmit a third packet in the wireless network to which the first wireless communication device belongs;
determine whether the NAV timer is zero;
in response to determining that i) the NAV timer is not zero, and ii) the NAV timer was most recently set in connection with a transmission from another wireless network to which the first wireless communication device does not belong, control the wireless network interface device to transmit the third packet.

12. The first wireless communication device of claim 11, wherein the one or more IC devices are further configured to:

in response to determining that i) the NAV timer is not zero, and ii) the NAV timer was most recently set in connection with the transmission from the wireless network to which the first wireless communication device belongs, determine that the third packet is not to be transmitted while the NAV timer is not zero.

13. The first wireless communication device of claim 7, wherein the NAV timer comprises a counter circuit implemented on the one or more IC devices.

14. The first wireless communication device of claim 7, wherein the wireless network interface device further comprises one or more transceivers implemented at least partially on the one or more IC devices.

15. The first wireless communication device of claim 14, further comprising:
one or more antennas coupled to the one or more transceivers.

16. The first wireless communication device of claim 7, further comprising:
a host processor coupled to the wireless network interface device.

* * * * *